United States Patent
Mikawa et al.

(10) Patent No.: US 10,348,957 B2
(45) Date of Patent: Jul. 9, 2019

(54) IMAGE CAPTURING APPARATUS, METHOD OF CONTROLLING THE SAME, AND STORAGE MEDIUM FOR SHOOTING A STILL IMAGE WITHOUT INTERRUPTING SHOOTING OF MOVING IMAGES

(71) Applicant: CANON KABUSHIKI KAISHA, Tokyo (JP)

(72) Inventors: Chiaki Mikawa, Yokohama (JP); Yosato Hitaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/793,117

(22) Filed: Oct. 25, 2017

(65) Prior Publication Data

US 2018/0124306 A1    May 3, 2018

(30) Foreign Application Priority Data

Nov. 2, 2016  (JP) .................................. 2016-215563

(51) Int. Cl.
   *H04N 5/232* (2006.01)
   *H04N 5/77* (2006.01)
   *H04N 9/804* (2006.01)

(52) U.S. Cl.
   CPC ..... *H04N 5/23216* (2013.01); *H04N 5/23229* (2013.01); *H04N 5/23264* (2013.01); *H04N 5/77* (2013.01); *H04N 5/772* (2013.01); *H04N 9/8042* (2013.01)

(58) Field of Classification Search
   CPC ............... H04N 5/2256; H04N 5/2351; H04N 5/23206; H04N 5/2354; G03B 7/093
   See application file for complete search history.

(56) References Cited

U.S. PATENT DOCUMENTS

| | | |
|---|---|---|
| 7,995,103 B2 | 8/2011 | Yagi |
| 8,743,227 B2 * | 6/2014 | Kunieda ............... H04N 1/2112 348/220.1 |
| 9,077,900 B2 * | 7/2015 | Baek ...................... H04N 1/212 |
| 2007/0188622 A1 * | 8/2007 | Yagi ...................... H04N 5/232 348/220.1 |
| 2008/0151317 A1 | 6/2008 | Imine |
| 2012/0038793 A1 | 2/2012 | Shimizu et al. |
| 2015/0163407 A1 * | 6/2015 | Khoury .................. G11B 27/02 348/208.5 |
| 2018/0077358 A1 | 3/2018 | Shintani et al. |

FOREIGN PATENT DOCUMENTS

| | | |
|---|---|---|
| JP | 2007-221451 A | 8/2007 |
| JP | 2008-160171 A | 7/2008 |

* cited by examiner

Primary Examiner — Hung H Lam
(74) Attorney, Agent, or Firm — Venable LLP

(57) ABSTRACT

An image capturing apparatus comprises an image capturing unit configured to sequentially output one or more frames of image data of moving images and one or more frames of image data of still images as frames on a per-frame basis, each still image being shot between shootings of the moving images; and a control unit configured to control the image capturing unit to shoot the still images at a first shutter speed and shoot the moving images at a second shutter speed, the first shutter speed being higher than the second shutter speed.

13 Claims, 14 Drawing Sheets

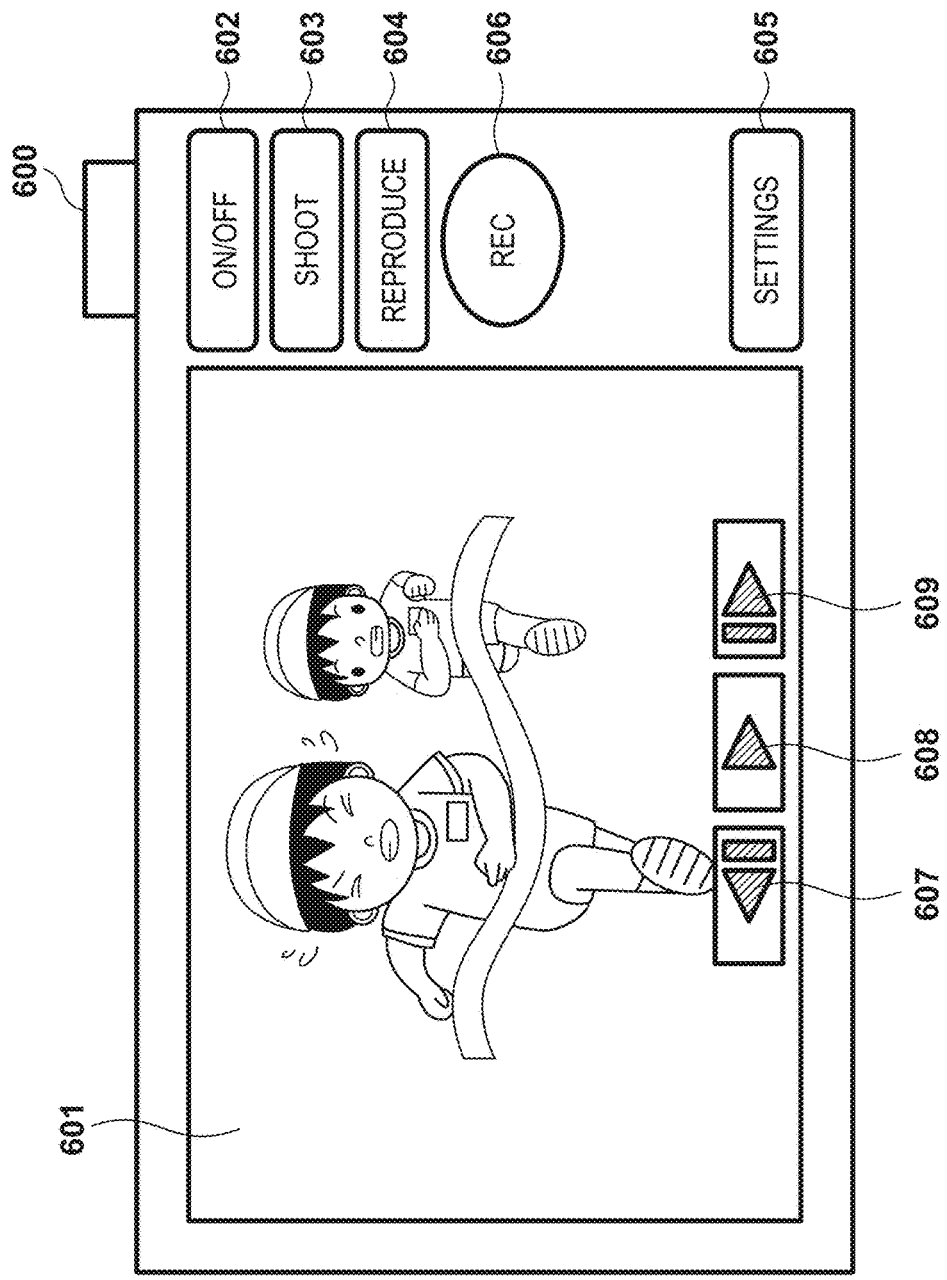

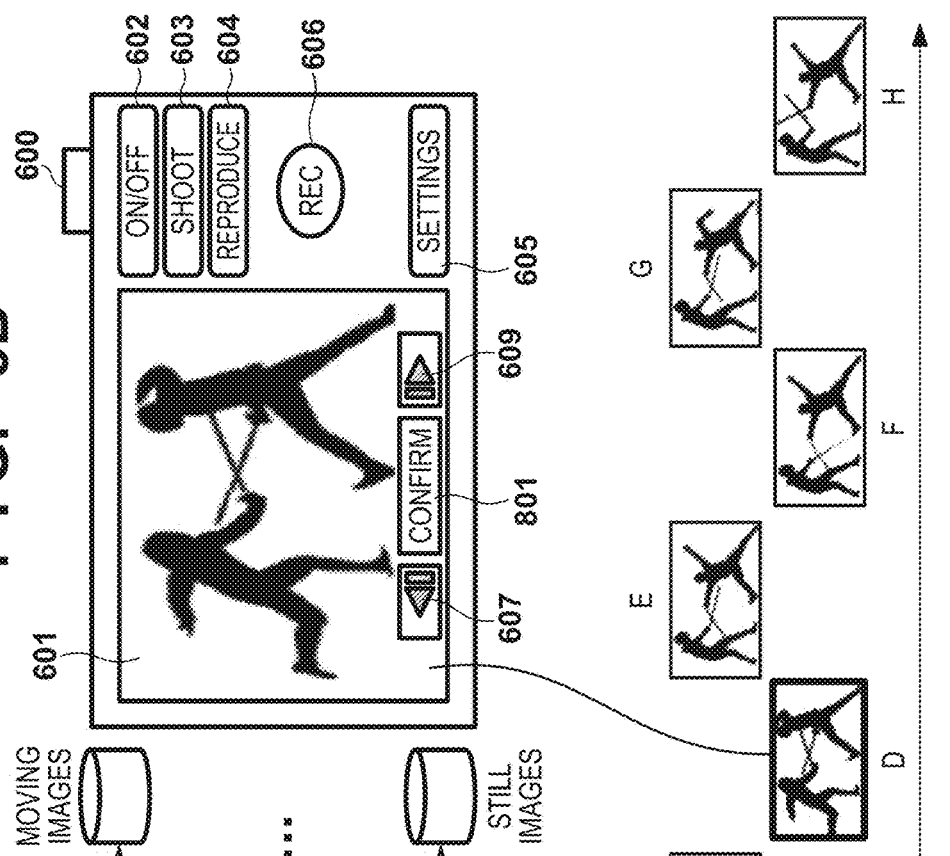
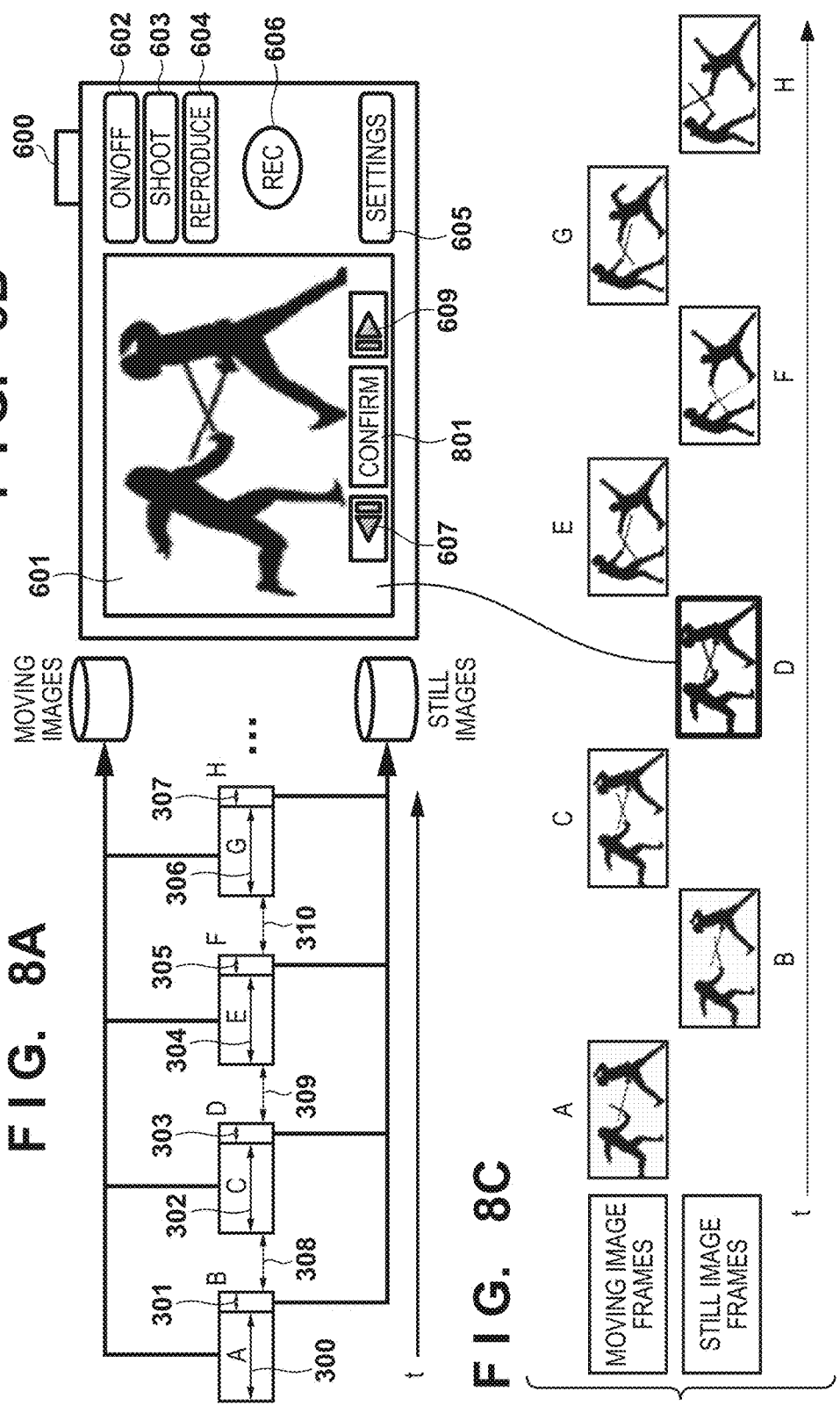

IMAGE CAPTURING APPARATUS, METHOD OF CONTROLLING THE SAME, AND STORAGE MEDIUM FOR SHOOTING A STILL IMAGE WITHOUT INTERRUPTING SHOOTING OF MOVING IMAGES

BACKGROUND OF THE INVENTION

Field of the Invention

The present invention relates to an image capturing apparatus, a method of controlling the same, and a storage medium for shooting a still image without interrupting shooting of moving images.

Description of the Related Art

In recent years, image capturing apparatuses that can shoot a still image while shooting moving images are known. Japanese Patent Laid-Open No. 2007-221451 discloses a technique to obtain a still image at a timing for shooting the still image by temporarily suspending current shooting of moving images, and perform interpolation using the still image to generate missed frames. Japanese Patent Laid-Open No. 2008-160171 discloses an image processing apparatus that selects one of a plurality of moving image frames in accordance with a user operation, extracts the selected frame as a still image, and provides the still image capturing a scene shot as the moving images.

With the technique disclosed in Japanese Patent Laid-Open No. 2007-221451, an unpleasant feeling that is induced by interpolation due to differences between settings of still image shooting and settings of moving image shooting is reduced; however, because shooting of moving images is interrupted and then resumed, interpolated moving images may leave an unpleasant feeling due to, for example, a change in a subject. On the other hand, with the technique disclosed in Japanese Patent Laid-Open No. 2008-160171, because a relatively low shutter speed of, for example, 1/60 second is set during shooting of moving images, a still image extracted from the moving images may exhibit a blurry subject if the subject is in motion.

SUMMARY OF THE INVENTION

The present invention has been made in consideration of the aforementioned problems, and realizes a technique that can, while shooting moving images, shoot still images with a reduction in blurring of a moving subject without interrupting shooting of the moving images.

In order to solve the aforementioned problems, one aspect of the present invention provides an image capturing apparatus, comprising: an image capturing unit configured to sequentially output one or more frames of image data of moving images and one or more frames of image data of still images as frames on a per-frame basis, each still image being shot between shootings of the moving images; and a control unit configured to control the image capturing unit to shoot the still images at a first shutter speed and shoot the moving images at a second shutter speed, the first shutter speed being higher than the second shutter speed.

Another aspect of the present invention provides, a control method of an image capturing apparatus comprising an image capturing unit configured to sequentially output one or more frames of image data of moving images and one or more frames of image data of still images as frames on a per-frame basis, each still image being shot between shootings of the moving images, the method comprising causing a control unit to control the image capturing unit to shoot the still images at a first shutter speed and shoot the moving images at a second shutter speed, the first shutter speed being higher than the second shutter speed.

Still another aspect of the present invention provides, a non-transitory computer-readable storage medium storing a computer program, for causing a computer to function as an image processing apparatus comprising: an image capturing unit configured to sequentially output one or more frames of image data of moving images and one or more frames of image data of still images as frames on a per-frame basis, each still image being shot between shootings of the moving images; and a control unit configured to control the image capturing unit to shoot the still images at a first shutter speed and shoot the moving images at a second shutter speed, the first shutter speed being higher than the second shutter speed.

According to the present invention, during shooting of moving images, still images can be shot with a reduction in blurring of a moving subject without interrupting shooting of the moving images.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 schematically shows a back surface of the digital camera according to a second embodiment.

FIGS. 8A to 8C are diagrams for describing a frame selection operation and user interfaces according to a third embodiment.

DESCRIPTION OF THE EMBODIMENTS

First Embodiment

An exemplary embodiment will now be described in detail with reference to the drawings. In particular, the following describes, as an example, an image capturing apparatus that shoots moving image frames and still image frames alternately at different shutter speeds, and sequentially records the moving image frames and the still image frames as a moving image file and a RAW moving image file, respectively.

In the following description, a low shutter speed and a high shutter speed will also be referred to as low-speed Tv and high-speed Tv, respectively, and blurring of a moving subject will also be referred to as subject blur. Image data of one screen generated by reading out an optical image using a solid-state image sensor will also be referred to as a frame. Control over reproduction, recording, and the like of N frames per second will be described using the expression "N fps."

Furthermore, in the following description, settings of the image capturing apparatus during shooting of each frame, such as the shutter speed, f-number, ISO film speed, and focal length, will also be referred to as shooting-time settings, and information that is necessary during reproduction of image data, such as the compression method, data size, and the number of pixels within the width and height of one frame, will also be referred to as reproduction-time information. Information that contains both the shooting-time settings and the reproduction-time information will also be referred to as attribute information.

In an example described below, an arbitrary digital camera capable of shooting moving images and still images is used as one example of the image capturing apparatus. However, the present embodiment is not limited to being applied to a digital camera, and can be applied to any device capable of shooting moving images and still images. Examples of such a device may include a mobile telephone (e.g., a smartphone), a game console, a tablet terminal, a watch-type or an eyeglass-type information terminal, a medical device, and a device for a surveillance system or an onboard system.

(Configuration of Digital Camera 10)

Figure 1:
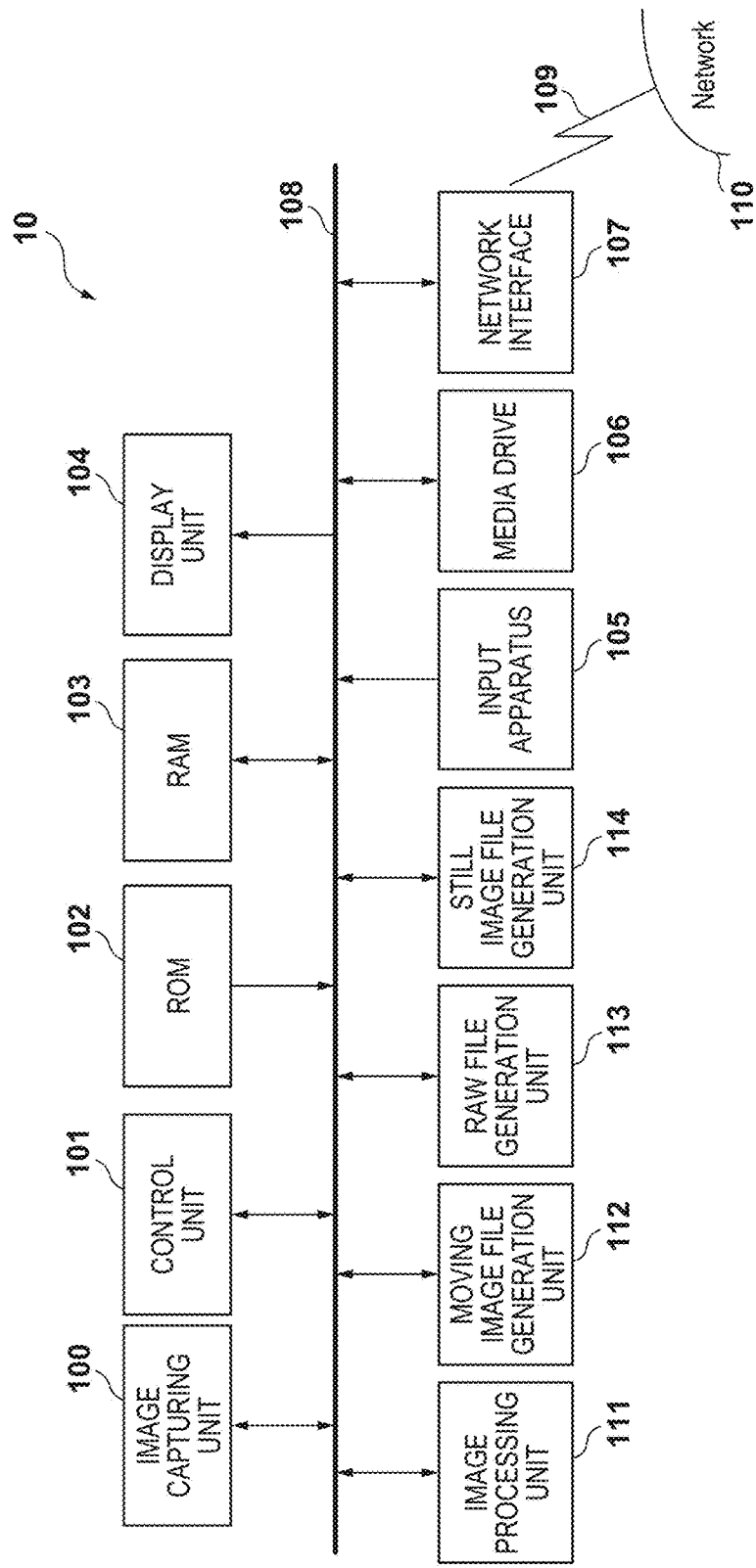
FIG. 1 is a block diagram showing an exemplary functional configuration of a digital camera used as one example of an image capturing apparatus according to a first embodiment.

FIG. 1 is a block diagram showing an exemplary functional configuration of a digital camera 10 according to the present embodiment. One or more of function blocks shown in FIG. 1 may be realized by hardware, such as an ASIC and a programmable logic array (PLA), or may be realized by software executed by a control unit or a programmable processor (e.g., an MPU). They may be realized by a combination of software and hardware. Therefore, the same hardware can be a main executor that realizes different function blocks, even if the different function blocks are described as the main executors of their operations in the following description.

An image capturing unit 100 includes a solid-state image sensor. It is configured in such a manner that a plurality of pixels that each have a photoelectric converter are arranged two-dimensionally. The solid-state image sensor photoelectrically converts an optical image of a subject formed by a non-illustrated shooting optical system on each pixel, executes analog-to-digital conversion using an A/D conversion circuit, and outputs digital signals (image data) on a per-pixel basis. The output image data is handled as image data to which image processing other than later-described compression processing (also referred to as RAW data) is not applied for the most part.

A control unit 101 controls an entirety of the digital camera 10. The control unit 101 includes, for example, a CPU or an MPU, controls the blocks of the digital camera 10 by executing programs stored in a ROM 102 and the like, and controls data transfer among the blocks. The ROM 102 stores procedures for processing related to the operations of the control unit 101 (e.g., programs for processing that is executed upon power ON of the digital camera 10, for basic input/output processing, and so forth).

A RAM 103 functions as a main memory for the control unit 101. Various types of programs, including control programs for realizing later-described processing, are loaded from the ROM 102 and the like to the RAM 103 and executed by the control unit 101. The RAM 103 also provides a working area that is used when the control unit 101 executes various types of processing.

A display unit 104 is, for example, an LCD or a similar display, and displays a menu screen, images and moving images stored in a storage medium, and the like in accordance with an instruction from the control unit 101. An input apparatus 105 is composed of, for example, buttons for performing various operations, such as a release button mounted on a top portion of the digital camera 10, a touchscreen, and so forth.

A media drive 106 enables a removable storage medium to be loaded, enables data to be stored, and enables stored data to be read out. A network interface 107 is connected to a computer network 110 via a communication line 109. This network interface enables transmission and reception of data to and from a server computer and a personal computer connected to the computer network 110. The foregoing components are connected to one another via a system bus 108 (composed of an address bus, a data bus, and a control bus).

Reference sign 111 denotes an image processing unit. The image processing unit 111 stores image data that has been generated by the control unit 101 using the image capturing unit 100, as well as attribute information at the time of the generation, to the RAM 103, and executes a sequence of image processing as necessary so that the image data suits visual characteristics of a human. This sequence of image processing will also be referred to as development processing. The development processing according to the present embodiment will be described later with reference to FIG. 5.

Reference sign 112 denotes a moving image file generation unit. The moving image file generation unit generates data that composes a moving image file by converting image data output from the image processing unit 111 into data that conforms to a general-purpose moving image format in accordance with an instruction from the control unit 101. In the present embodiment, data that conforms to a general-purpose moving image format refers to, for example, video data that has been compressed based on H.264, as well as audio data that has been compressed based on AAC. A sequence of processing from shooting to recording of a moving image file executed by the moving image file generation unit 112 will be described later with reference to FIGS. 2A and 2B.

Reference sign 113 denotes a RAW file generation unit. The RAW file generation unit 113 generates data that composes a raw file by applying compression processing to RAW data in accordance with an instruction from the control unit 101. In the present embodiment, lossless compression, which does not incur deterioration in image quality caused by compression, is applied to RAW data using a run-length method, for example. A sequence of processing from shooting to recording of a RAW file will be described later with reference to FIGS. 2A and 2B.

Reference sign 114 denotes a still image file generation unit. The still image file generation unit converts image data output from the image capturing unit 100 into a general-purpose still image format in accordance with an instruction from the control unit 101. In the present embodiment, it will be assumed that a general-purpose still image format is JPEG, for example. A sequence of processing from shooting to recording of a still image file will be described later in connection with a second embodiment.

(Sequence of Operations Related to Image Capturing Processing)

Figure 2A:
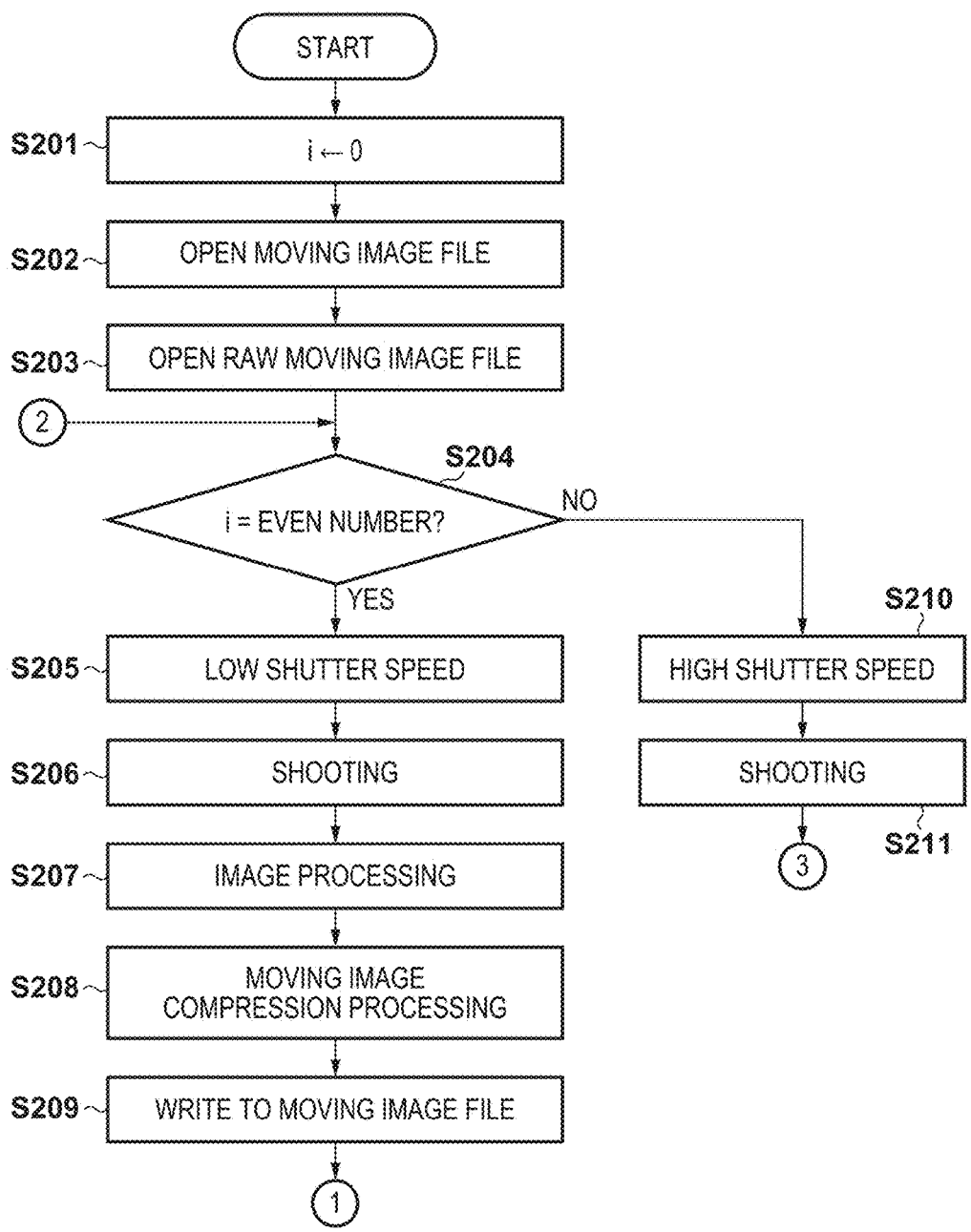
FIGS. 2A and 2B are flowcharts showing a sequence of operations for image capturing processing according to the first embodiment.
Figure 2B:
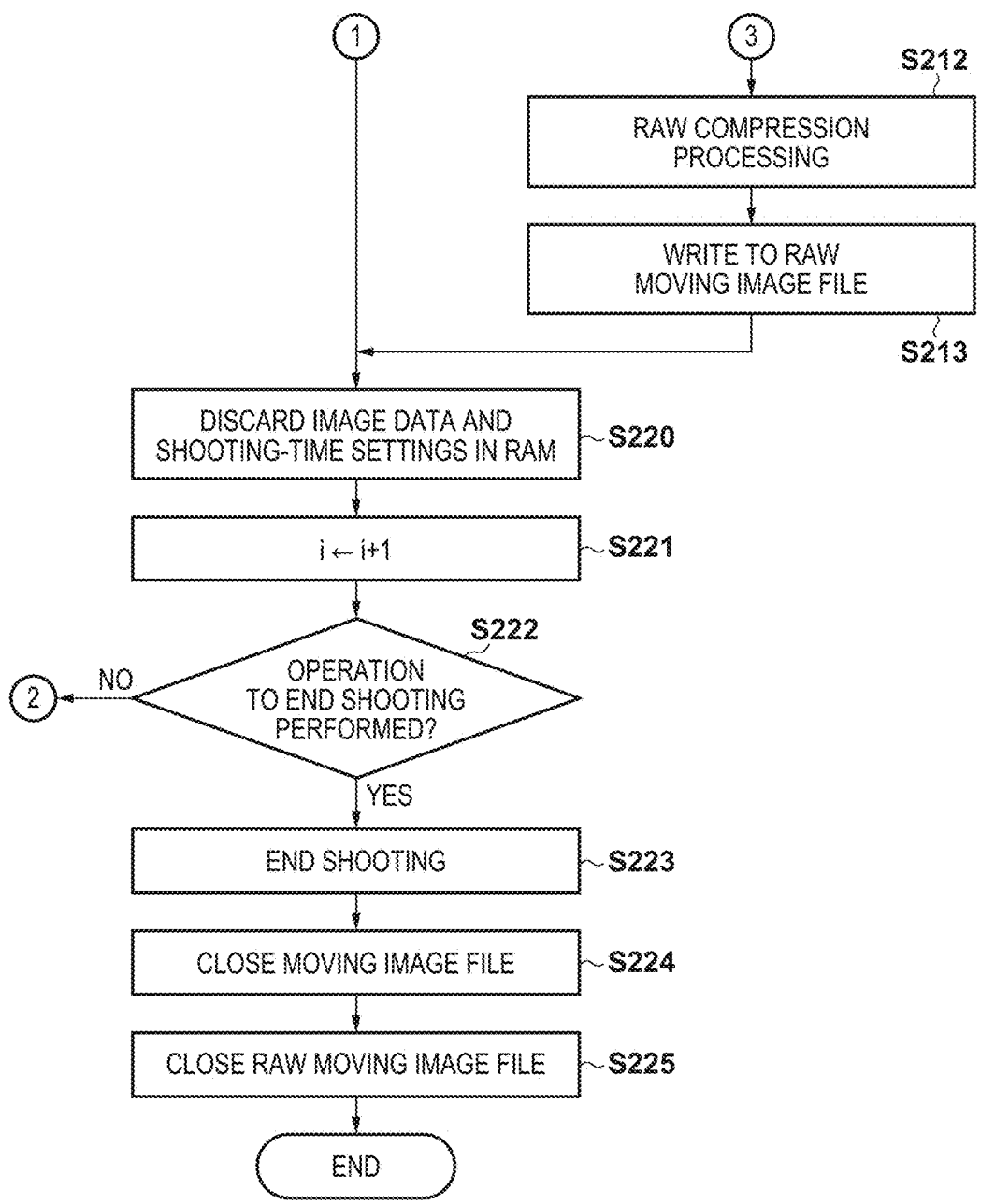

With reference to FIGS. 2A and 2B, a description is now given of a sequence of operations for image capturing processing according to the present embodiment. This processing is executed by the control unit 101 executing a control program loaded to the RAM 103. When a user has pressed the release button (or image recording button), which is one of the components of the input apparatus 105, the control unit 101 determines that the user has performed an operation to start shooting, and executes the following image capturing processing. In the description of the present embodiment, it will be assumed that image data is read out from the image sensor at an equal interval at 120 fps.

In step S201, the control unit 101 assigns an initial value 0 to a counter i, which is intended to count pieces of image data output from the image capturing unit 100. In step S202, the control unit 101 generates a moving image file in a removable recording medium via the media drive 106, and places the moving image file in a writable state. At this time, it writes reproduction-time information, which does not change with time, to a header of the moving image file, and stores the same as reproduction-time information for moving images to the RAM 103.

In step S203, the control unit 101 generates a RAW moving image file in the removable recording medium via the media drive 106, and places the RAW moving image file in a writable state. This RAW moving image file contains frames that are each composed of RAW data, and has a sufficient image quality to output each frame as a still image. In outputting recorded frames of a moving image file as still images, still images of higher image quality can be obtained by using the RAW moving image file shown in FIG. 4 than by using moving images of an MP4 format. At this time, the control unit 101 writes reproduction-time information, which does not change with time, to a header of the RAW moving image file, and stores the same as reproduction-time information for still images to the RAM 103.

In step S204, the control unit 101 determines whether the counter i, which is intended to count pieces of image data output from the image capturing unit 100, indicates an even number. When i indicates an even number, step S205 follows to process a moving image. When i indicates an odd number, step S210 follows to process a still image.

In step S205, the control unit 101 sets the lowest possible shutter speed to process the moving image. This is because, when a moving subject is shot as moving images at N fps, a shutter speed of $1/(2 \times N)$ second will produce smooth moving images. In contrast, when the shutter speed exceeds $1/(2 \times N)$ second, the higher shutter speed will increase a non-exposure period and enhance differences between subject images in frames that are adjacent on a time axis, thereby producing jerky and unpleasant moving images. In view of this, as the speed of readout from the image sensor is 120 fps, the control unit 101 sets the lowest possible shutter speed of Tv $1/120$ based on the readout speed.

In step S206, the control unit 101 causes the image capturing unit 100 to perform shooting at the shutter speed that was decided on in step S205, and stores RAW data and shooting-time settings to the RAM 103. In step S207, the control unit 101 causes the image processing unit 111 to apply image processing to the RAW data stored in the RAM 103. It also stores the obtained image processing result to the RAM 103. In step S208, the control unit 101 generates data that composes the moving image file by causing the moving image file generation unit 112 to compress the image data in the RAM 103, which was generated in step S207. In step S209, the control unit 101 sequentially writes the data and the shooting-time settings generated in step S202 to the moving image file.

In step S210, the control unit 101 sets a shutter speed that is higher than the speed (Tv $1/120$) set in step S205 in order to process the still image. This is because, when a moving subject is shot as still images, subject blur is suppressed in the obtained still images at a high-speed Tv of approximately Tv $1/1000$ (although it varies depending on a moving speed on an imaging plane). In the case of a low-speed Tv of Tv $1/120$ or more, subject blur occurs often, and there is a possibility that the subject cannot be identified from the obtained still images. For this reason, the shutter speed is set to Tv $1/1000$ that inhibits the occurrence of subject blur even in the presence of a moving subject, for example.

In step S211, the control unit 101 causes the image capturing unit 100 to perform shooting at the shutter speed that was decided on in step S210, and stores RAW data and shooting-time settings to the RAM 103. In step S212, the control unit 101 causes the RAW file generation unit 113 to apply compression processing to the RAW data stored in the RAM 103. It also stores data obtained through the compression processing to the RAM 103. In step S213, the control unit 101 sequentially writes the data obtained through the compression in step S212 and the shooting-time settings to the RAW moving image file generated in step S203.

In step S220, the control unit 101 discards the image data and the corresponding shooting-time settings in the RAM 103, which have been written to the file and are hence no longer needed. Then, in step S221, the control unit 101 increments the counter i (+1) to indicate that one cycle of processing for the image data has been completed.

In step S222, the control unit 101 determines whether an operation to end shooting has been performed. When the user has pressed the release button (or image recording stop button), which is one of the components of the input apparatus 105, the control unit 101 determines that the user has performed the operation to end shooing, and proceeds to step S223. When it determines that the operation to end shooting has not been performed, it returns to step S204.

In step S223, the control unit 101 ends shooting of moving image frames and still image frames. In step S224, the control unit 101 appends information that indicates an end to a footer of the moving image file, updates information of the header to be referred to when reading in the file, and ends writing to the moving image file. In step S225, the control unit 101 appends information that indicates an end to a footer of the RAW moving image file, updates information of the header to be referred to when reading in the file, and ends writing to the RAW moving image file. Once writing to the RAW moving image file has been ended, the control unit 101 ends the sequence of operations for the image capturing processing.

Figure 3:
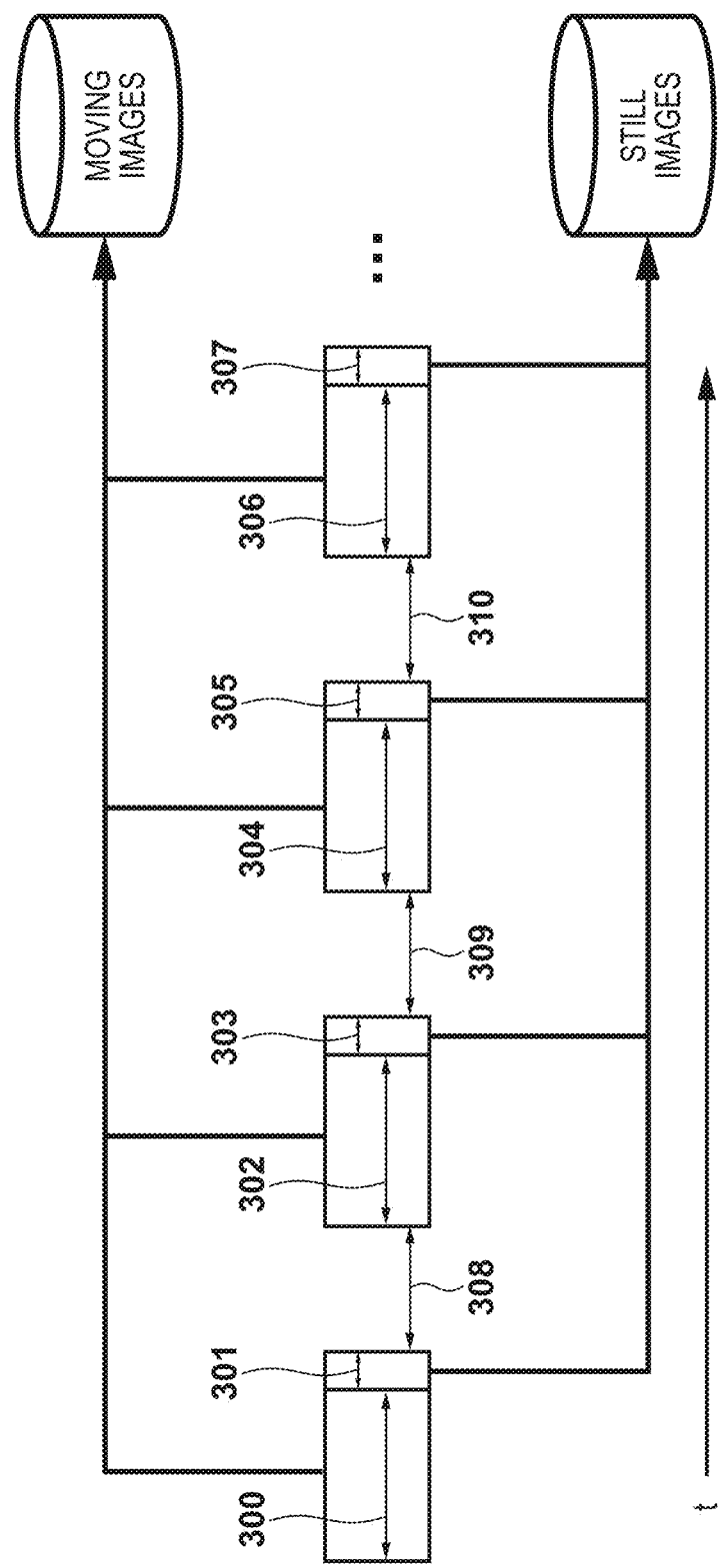
FIG. 3 schematically shows timings for shooting in the image capturing processing according to the first embodiment.

Timings for shooting the moving image frames and the still image frames in the foregoing image capturing processing are shown in FIG. 3. Periods 300, 302, 304, and 306 shown in FIG. 3 represent exposure periods during shooting of the moving image frames in step S206. The control unit 101 sequentially records the frames that are shot in the exposure periods 300, 302, 304, and 306 as the moving image file.

On the other hand, periods 301, 303, 305, and 307 shown in FIG. 3 represent exposure periods during shooting of the still image frames in step 211. The control unit 101 sequentially records the frames that are shot in the exposure periods 301, 303, 305, and 307 as the RAW moving image file. Periods 308, 309, and 310 shown in FIG. 3 represent non-exposure periods, and they occur when readout from the image sensor is performed at an equal interval on the time axis.

(Structure of RAW Moving Image File)

Figure 4:
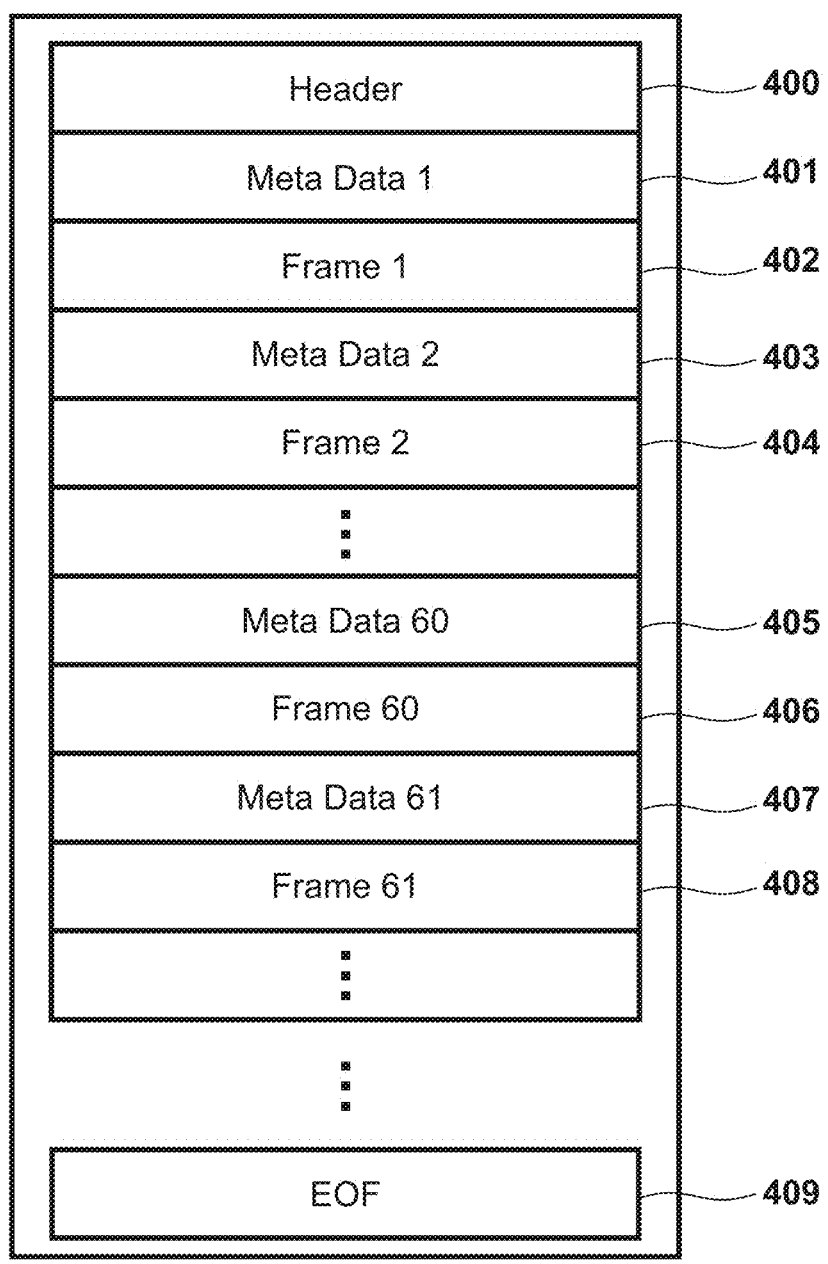
FIG. 4 schematically shows a structure of a RAW moving image file according to the first embodiment.

With reference to FIG. 4, a description is now given of a structure of the RAW moving image file according to the present embodiment.

A header 400 shown in FIG. 4 stores reproduction-time information, including a data structure. Pieces of metadata 401, 403, 405, and 407 represent shooting-time information storage sections that store the shooting-time settings in step S211. Because the brightness of and the distance to a subject vary each time shooting is performed, each storage section stores the shooting-time settings of the corresponding still image frame.

Frames 402, 404, 406, and 408 represent image data which is obtained through shooting in step S211 and to which the compression processing is applied in step S212. The image data 402 corresponds to shooting based on the shooting-time settings 401, and the image data 404 corresponds to shooting based on the shooting-time settings 403. Similarly, the image data 406 corresponds to the shooting-time settings 405, and the image data 408 corresponds to the shooting-time settings 407. Information 409 is recorded as the information that indicates the footer of the file in step S225.

(Sequence of Operations Related to Development Processing)

Figure 5:
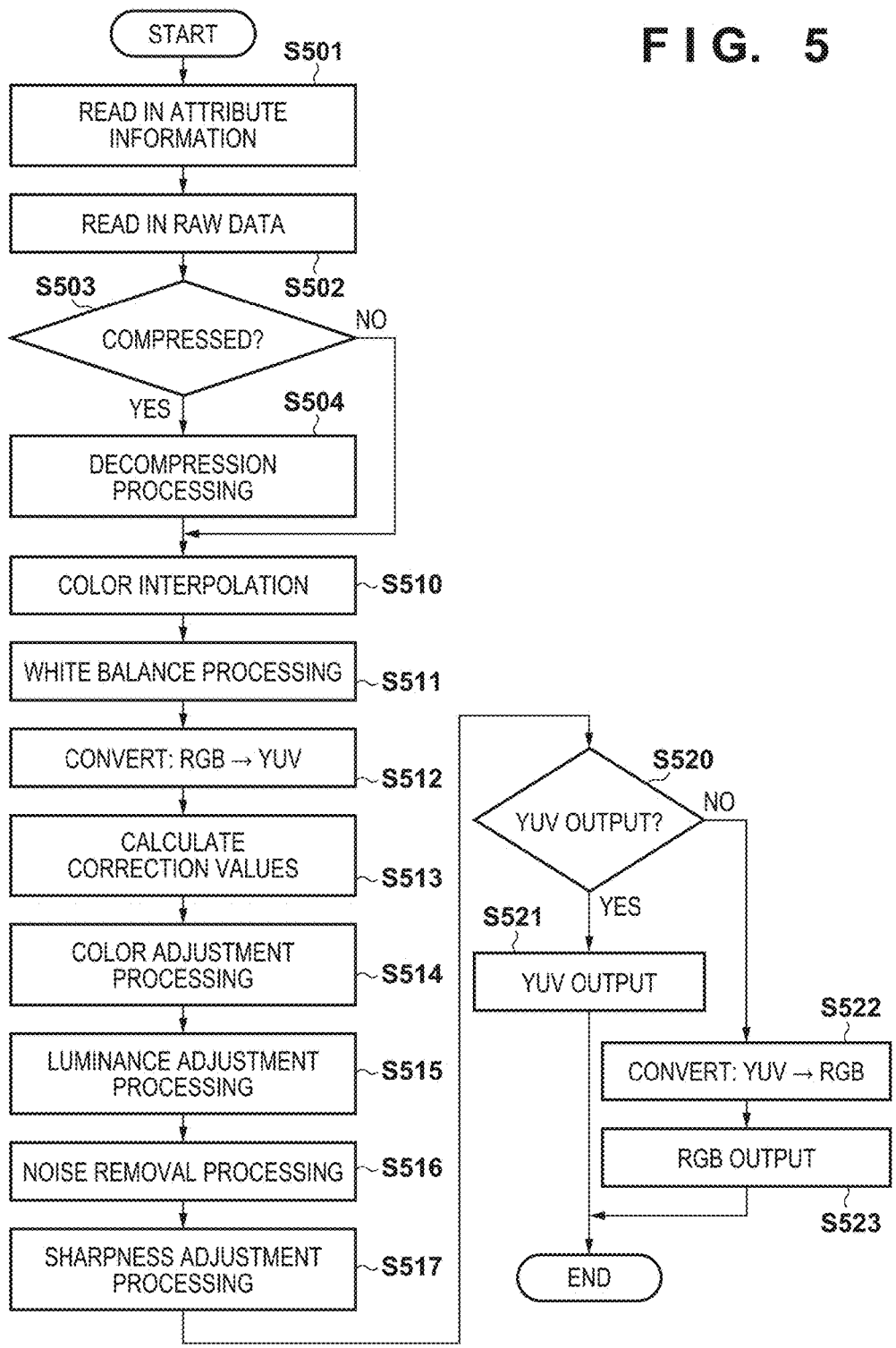
FIG. 5 is a flowchart showing a sequence of operations for development processing according to the first embodiment.

With reference to FIG. 5, a description is now given of a sequence of operations for the development processing according to the present embodiment. This processing is executed by the control unit 101 executing a control program loaded to the RAM 103. Furthermore, this processing is executed in step S207 in which the image processing is applied to a moving image frame as a part of the above-described image capturing processing. Alternatively, this processing may be executed to display image data on the display unit 104 when the user has performed an operation to reproduce the RAW moving image file composed of the RAW data illustrated in FIG. 4. In this case, it will be assumed that the control unit 101 reads in the RAW moving image file to be processed from the removable storage medium to the RAM 103 via the media drive 106.

In step S501, the control unit 101 reads in attribute information from the RAM 103. When reading in the attribute information from the RAW moving image file, it reads in header information and shooting-time settings corresponding to a frame to be processed. In step S502, the control unit 101 reads in RAW data to be processed from the RAM 103. In step S503, the control unit 101 determines whether the RAW data has been compressed with reference to the attribute information. If it determines that the RAW data has been compressed, it proceeds to step S504. If the RAW data has not been compressed, it proceeds to step S510. In step S504, the control unit 101 applies decompression processing to the compressed data.

In step S510, the control unit 101 applies color interpolation processing to the RAW data. In the present embodiment, it will be assumed that the RAW data conforms to the Bayer array in which color filters of three primary colors, RGB, are arranged alternately. In the case of the Bayer array, as each pixel has a color signal corresponding to only one color, interpolation processing is executed to calculate the remaining color signals. The control unit 101 executes interpolation processing based on, for example, linear interpolation.

In step S511, the control unit 101 executes white balance processing in accordance with the attribute information. The white balance processing converts the shades of colors so that achromatic colors of a subject that was shot under various light sources are presented as achromatic colors. In developing a moving image frame, the white balance processing is executed in consideration of the shades of colors of preceding and succeeding frames so that the shades of colors change smoothly on the time axis. In developing a still image frame, the white balance processing is executed so as to optimize the shades of colors of each individual frame.

In step S512, the control unit 101 converts RGB color signals into YUV signals. In step S513, the control unit 101 calculates correction values for noise removal and correction values for luminance correction with respect to image signals. Specifically, when the shooting-time settings show the ISO film speed lower than ISO 800, 0 is set as a parameter for noise removal processing. When the ISO film speed is equal to or higher than ISO 800, the parameter is set in such a manner that the higher the ISO film speed, the more intense the noise removal processing. For example, the control unit 101 sets 1, 2, and 4 as the parameter in the cases of ISO 800, ISO 1600, and ISO 3200, respectively; in this way, the parameter changes linearly in accordance with the film speed. Given the average luminance Y_ave of the entire image data and a target luminance signal Y_target, a luminance correction parameter Y_gain is calculated in accordance with Expression 1.

$$Y\_gain = Y\_ave \div Y\_target \quad \text{Expression 1}$$

In developing a moving image frame, the target luminance signal is decided on so that the luminance changes smoothly on the time axis. In developing a still image frame, the target luminance signal is decided on so that the luminance of each individual frame exhibits the best visual quality.

In step S514, the control unit 101 executes color adjustment processing in accordance with the attribute information. In developing a moving image frame, the color adjustment processing is executed so that the shades of colors change smoothly on the time axis. In developing a still image frame, the color adjustment processing is executed so that each individual frame has the optimal shades of colors.

In step S515, the control unit 101 adjusts the luminance using the luminance correction parameter calculated in step S513. In step S516, the control unit 101 executes the noise removal processing using the parameter for the noise removal processing calculated in step S513. In developing a moving image frame, simple noise removal processing is executed in a short amount of time. In developing a still image frame, more pixels are input to a smoothing filter for noise reduction as needed so as to eliminate noise of each individual frame.

In step S517, the control unit 101 executes sharpness adjustment processing that adjusts, for example, the intensity of edges of a subject. In developing a moving image frame, simple sharpness adjustment processing is executed in a short amount of time. In developing a still image frame, more pixels are input to a filter for edge enhancement as needed.

In step S520, the control unit 101 determines whether to perform output in a YUV format. In the present embodiment, it will be assumed that moving image frames are output in the YUV format. It will also be assumed that still image frames are output to the display unit 104 in an RGB format. If it is determined that output is to be performed in the YUV format, step S521 follows. If it is not determined that output is to be performed in the YUV format, step S522 follows.

In step S521, the control unit 101 outputs YUV image data as the output moving image frame to the RAM 103, and ends the sequence of operations related to the present development processing. In step S522, the control unit 101 converts YUV signals into RGB color signals so as to output them as the still image frame. Furthermore, in step S523, the control unit 101 outputs RGB image data to the RAM 103, and ends the sequence of operations related to the present development processing.

In the foregoing description of the noise removal processing, more pixels are input to the smoothing filter in developing a still image frame by way of example; however, the noise removal processing may be executed by compositing a moving image frame or a still image frame that is adjacent on the time axis.

In the foregoing description of the present embodiment, image data is read out from the image sensor at an equal interval at 120 fps by way of example; however, the speed of readout from the image sensor may change, in which case the frame rate and the shutter speed may be decided on in accordance with the readout speed. For example, when the readout speed is doubled, image data may be read out at an equal interval at 240 fps. In this case, the moving image file is composed of moving images of 120 fps, and the RAW moving image file is composed of still image frames of 120 fps. In this case, the lowest-speed Tv for shooting moving image frames is $1/240$. When the readout speed is reduced by half, image data may be read out at an equal interval at 60 fps. In this case, the moving image file is composed of moving images of 30 fps, and the RAW moving image file is composed of still image frames of 30 fps. In shooting moving images at 30 fps, the lowest-speed Tv for shooting moving image frames is Tv $1/60$.

In the foregoing description of the present embodiment, image data is read out from the image sensor at an equal interval at 120 fps by way of example. However, when readout can be performed at irregular intervals, moving image frames may be read out at low speed in accordance with the shutter speed, and still image frames may be read out at high speed in accordance with the shutter speed. In this way, exposure periods during shooting of moving image frames can be adjusted to a greater extent, and smoother moving image frames can be obtained.

In the foregoing description of the present embodiment, moving image frames and still image frames are sequentially output from the image sensor in an alternating fashion by way of example. However, frames may be output at an equal interval to realize a predetermined ratio between the number of moving image frames and the number of still image frames (e.g., one still image frame is output per two moving image frames). This can reduce a data amount of still images when it is not necessary to have many still images of different moments. Furthermore, the control unit 101 may perform control to make an output interval of shot still image frames variable, and to output the still image frames when, for example, an appropriate shooting environment for recording the still image frames has been established. This can reduce the harmful effects of accumulation of still image frames with poor quality (e.g., still image frames obtained while changing shooting conditions).

As described above, in the present embodiment, when a predetermined number of pieces of image data can be read out from the image sensor per unit time, the lowest possible shutter speed is set to shoot moving images and the highest possible shutter speed is set to shoot still images based on the readout speed. Specifically, these shutter speeds are set with a substantial difference therebetween. When the speed of readout from the image sensor is 120 fps, the moving image file is composed of moving images of 60 fps, and its moving image frames can be shot at Tv $1/120$. On the other hand, the RAW moving image file is composed of still image frames of 60 fps, and the still image frames can be shot at Tv $1/1000$. Therefore, during shooting of moving images, smooth moving images can be obtained without interrupting shooting of the moving images, and still images can be shot with a reduction in blurring of a moving subject.

Furthermore, in the present embodiment, moving image data and still image data are read out from the image sensor independently of each other, and image processing is independently applied to each of the moving image data and the still image data. In this way, development processing suitable for still images is applied to RAW data that composes the RAW moving image file. In other words, high-quality still images can be obtained compared with a case of extracting and outputting moving image frames that have been recorded after undergoing development processing suitable for moving images.

Similarly, compression suitable for still images is applied to RAW data that composes the RAW moving image file. In this way, high-quality still images can be obtained without getting subjected to deterioration caused by compression compared with a result of extracting frames from a moving image file that has a general-purpose format, such as MP4, after undergoing H.264 compression.

Furthermore, in the present embodiment, a still image frame is shot regularly between shootings of moving image frames (i.e., still image frames and moving image frames are shot alternately). Therefore, frames are continuously recorded from the start to the end of the user's shooting operation. In this way, high-quality still images can be obtained at an interval of $1/60$ second, no matter when the best moment occurs during a period of shooting of moving images.

Furthermore, in the present embodiment, still image frames are recorded as one integrated RAW moving image file rather than as individual still image files, and relevant metadata is appended to each frame. This is expected to facilitate file management, as well as a search for metadata that matches a desired condition during browsing.

Second Embodiment

A second embodiment will now be described. The foregoing first embodiment pertains to a configuration in which, from the start to the end of the user's shooting operation, moving image frames and still image frames are shot alternately and recorded in their respective files continuously. In contrast, the second embodiment pertains to a configuration in which recorded moving images and still images are reproduced. Furthermore, in this configuration, still image frames are recorded in a JPG file serving as a still image file only in a partial period during shooting. That is to say, the present embodiment differs from the first embodiment in parts of the display unit 104, the input apparatus 105, and the image capturing processing, but is the same as the first embodiment in other components of the digital camera 10. Therefore, the same reference sign is given to the same components and the same processing to avoid redundant explanations, and the differences will be focused in the following description.

(User Interfaces for Reproducing Moving Images and Still Images)

FIG. 6 shows the digital camera 10 according to the present embodiment as viewed in a direction facing a back surface thereof, and the back surface has user interfaces (touchscreen menus and various buttons) included in the input apparatus 105. The digital camera 10 according to the present embodiment can switch among three types of operation modes, and the control unit 101 operates in accordance with each mode. The three types of operation modes are: a "shooting mode" that performs shooting; a "reproduction mode" that displays image data in the storage medium; and a "setting mode" that configures various settings. In the following description, the operations related to all of the buttons, except for a power button 602, are carried out when the power of the digital camera 10 is ON.

Reference sign 600 denotes the release button. During a period in which the user is pressing the release button 600 in the shooting mode, the control unit 101 determines that an instruction to shoot still images continuously during this period has been issued, and executes later-described image capturing processing shown in FIGS. 7A and 7B.

Reference sign 601 denotes a display, which is included in the above-described display unit 104. The display 601 has a display function and a touchscreen function, and fulfills a part of the functions of the input apparatus 105. When the user has pressed an arbitrary point on a screen with his/her finger, the control unit 101 determines that the user has input an instruction, determines the content of the operation based on the pressed position, and performs display control that involves, for example, updating of display. FIG. 6 shows an exemplary state in which the display 601 is displaying a moving image file to be reproduced in the reproduction mode.

Reference sign 602 denotes a power button that switches between power ON and power OFF. When the user has pressed the power button 602 in a state in which the power of the digital camera 10 is not ON, the control unit 101 detects a signal change and activates the digital camera 10. When the user has pressed the power button 602 in a state in which the power of the digital camera 10 is ON, the control unit 101 determines that the user has issued an instruction to turn OFF the power, and turns OFF the power of the digital camera 10.

Reference sign 603 denotes a shooting mode button. When the user has pressed the shooting mode button 603, the control unit 101 determines that the user has issued an instruction to switch to the shooting mode, switches to the shooting mode, and prepares for shooting by the image capturing unit 100. Then, it applies image processing to image data that has been read out from a formed optical image of a subject, and displays the resultant image data on the display 601.

Reference sign 604 denotes a reproduction button. When the user has pressed the reproduction button 604, the control unit 101 determines that the user has issued an instruction to switch to the reproduction mode, reads in a moving image file and a still image file from the storage medium, and displays images on the display 601. Reference sign 605 denotes a setting button. When the user has pressed the setting button 605, the control unit 101 determines that the user has issued an instruction to switch to the setting mode, and displays a setting screen on the display 601.

Reference sign 606 denotes a REC button. When the user has pressed the REC button 606 in the shooting mode, the control unit 101 determines that the user has issued an instruction to start shooting moving images, and starts shooting moving images. When the user has pressed the REC button 606 during shooting of moving images, the control unit 101 determines that an instruction to end shooting of moving images has been issued, and ends shooting of moving images.

Reference sign 607 denotes a previous frame button. When the user has pressed the previous frame button 607 while moving images to be reproduced are paused in the reproduction mode, the control unit 101 determines that the user has performed an operation to display a frame that immediately precedes a frame that is currently displayed. Accordingly, the immediately preceding frame is displayed on the display 601. At this time, if there is information related to a still image corresponding to the target moving image frame, the control unit 101 specifies a corresponding JPG file using this information related to the corresponding still image, and reproduces the specified JPEG file. The information related to the corresponding still image will be described later with reference to FIGS. 7A and 7B. If the information related to the still image corresponding to the target moving image frame does not exist, the target moving image frame is displayed as-is. When the first moving image frame is displayed, the control unit 101 disables the previous frame button so that display is not updated even if the user presses the previous frame button.

Reference sign 608 denotes a reproduction/pause toggle button. While moving images to be reproduced are paused in the reproduction mode, a mark indicating reproduction (e.g., a rightward arrow) is displayed as the reproduction/pause toggle button; when the user has pressed the reproduction/ pause toggle button in this state, the control unit 101 determines that the user has performed an operation to reproduce a moving image file, and reproduces the moving image file. When a JPG file that was simultaneously recorded is displayed, the control unit 101 specifies a corresponding moving image frame with reference to moving image information recorded in a header of that JPG file. Then, reproduction of moving images is started from the specified moving image frame. The moving image information will be described later with reference to FIGS. 7A and 7B. During reproduction of moving images, a mark indicating pause (e.g., two vertical lines) is displayed as the reproduction/pause toggle button; when the user has pressed the reproduction/pause toggle button in this state, the control unit 101 determines that the user has performed an operation to pause reproduction of a moving image file, and pauses reproduction of the moving image file. At this time, if there is information related to a still image corresponding to a moving image frame in pause, the control unit 101 specifies a corresponding JPG file using this information related to the still image, and reproduces the specified JPEG file.

Reference sign 609 denotes a next frame button. When the user has pressed the next frame button 607 while moving images to be reproduced are paused in the reproduction mode, the control unit 101 determines that the user has performed an operation to display a frame that immediately succeeds a frame that is currently displayed. Accordingly, the immediately succeeding frame is displayed. At this time, if there is information related to a still image corresponding to the target moving image frame, the control unit 101 specifies a corresponding JPG file using this information related to the still image, and reproduces the specified JPEG file. If the information related to the still image corresponding to the target moving image frame does not exist, the target moving image frame is displayed as-is. When the last moving image frame is displayed, the control unit 101 disables the next frame button so that display is not updated even if the user presses the next frame button.

(Sequence of Operations Related to Image Capturing Processing)

Figure 7A:
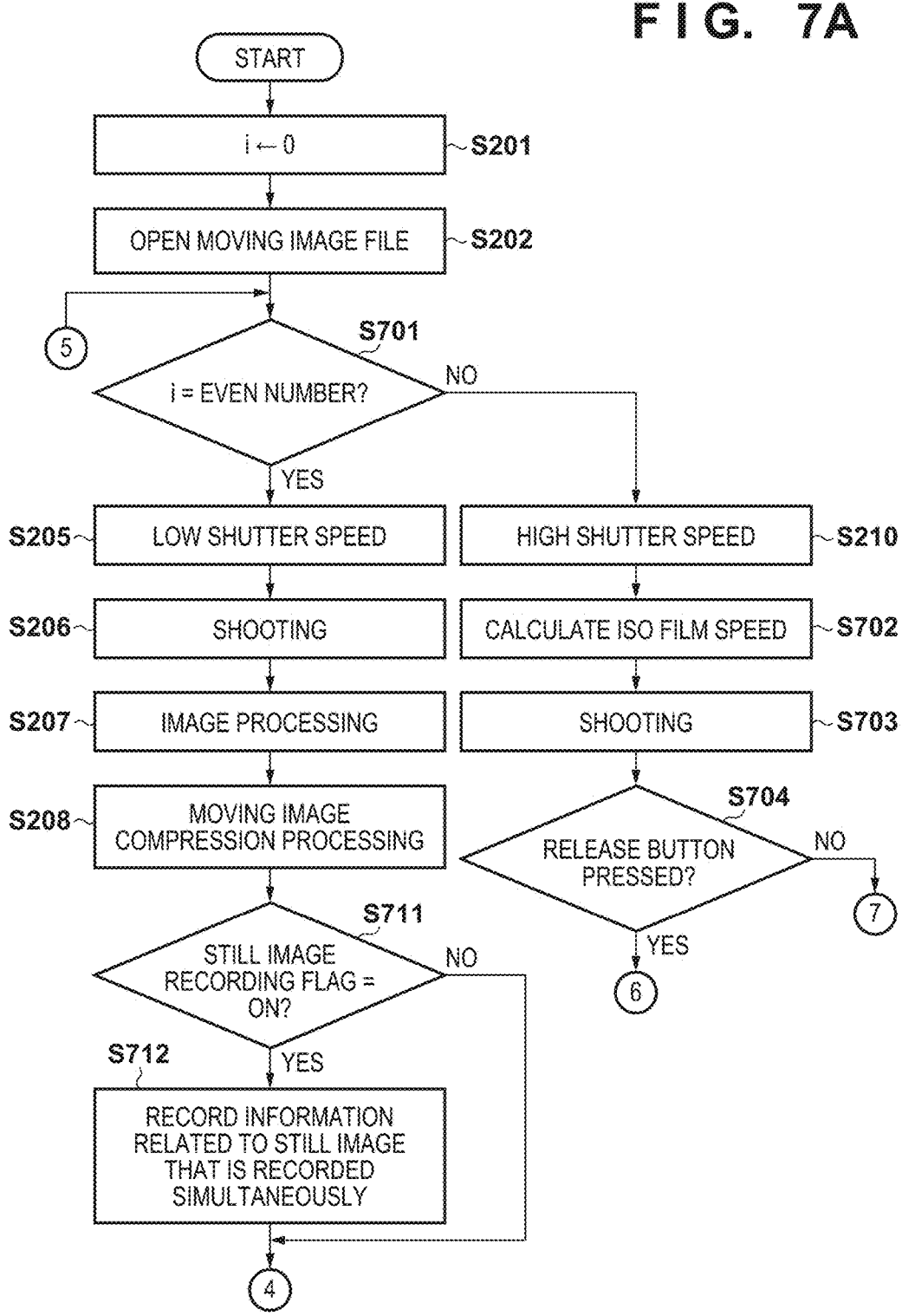
FIGS. 7A and 7B are flowcharts showing a sequence of operations for image capturing processing according to the second embodiment.
Figure 7B:
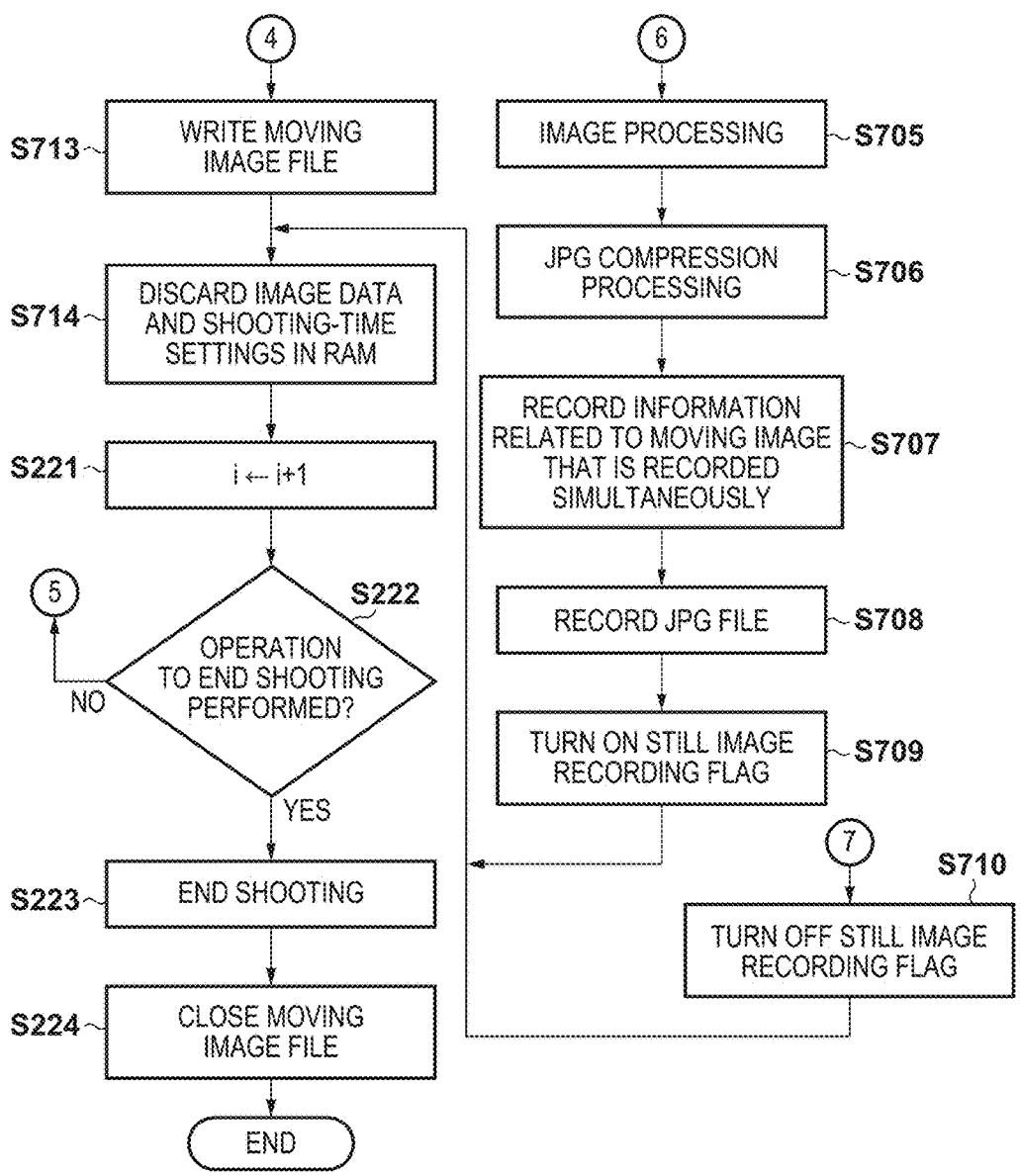

With reference to FIGS. 7A and 7B, a description is now given of a sequence of operations related to the image capturing processing according to the present embodiment. This processing is executed by the control unit 101 executing a control program loaded to the RAM 103. For example, when the REC button 606 has been pressed in the shooting mode, the control unit 101 determines that the user has performed an operation to start shooting, and executes this image capturing processing.

The control unit 101 executes steps S201 and S202 as in the first embodiment, and proceeds to step S701. Note that in the second embodiment, a still image file is not opened at this point.

In step S701, the control unit 101 determines whether the counter i, which is intended to count pieces of image data sequentially output from the image capturing unit 100, indicates an even number. When i indicates an even number, step S205 follows to process a moving image. When i indicates an odd number, step S210 follows to process a still image.

The control unit 101 executes the processes of steps S205 to S208 as in the first embodiment to apply moving image compression processing to the moving image that was shot at a low shutter speed. Meanwhile, the control unit 101 sets a high shutter speed to shoot a still image as in step S210.

In step S702, the control unit 101 calculates an ISO film speed in accordance with Expression 2 so as to achieve the substantially same luminance (brightness) as a moving image frame.

$$sISO = mTv \times mISO \div sTv \qquad \text{Expression 2}$$

Note that mTv and mISO denote the shutter speed and the value of the ISO film speed during shooting of the moving image frame, respectively, and sTv and sISO denote the shutter speed and the value of the ISO film speed during shooting of the still image frame. Alternatively, the control unit 101 may change the ISO film speed so as to bring the luminance (brightness) of the still image frame close to the luminance (brightness) of the moving image frame.

In step S703, the control unit 101 causes the image capturing unit 100 to perform shooting at the shutter speed that was decided on in step S210 and the ISO film speed that was decided on in step S702, and stores RAW data and shooting-time settings to the RAM 103. In step S704, the control unit 101 determines whether the release button 600, which is one of the components of the input apparatus 105, is pressed. If it determines that the release button is pressed, it proceeds to step S705. If it determines that the release button is not pressed, it proceeds to step S710.

In step S705, the control unit 101 causes the image processing unit 111 to apply image processing to the RAW data stored in the RAM 103. In this image processing, the development processing for still image frames, which has been described with reference to FIG. 5, is executed. Thereafter, the control unit 101 stores the obtained image processing result to the RAM 103.

In step S706, the control unit 101 causes the still image file generation unit 114 to compress the image data in the RAM 103 that was generated in step S705. In step S707, the control unit 101 stores information related to a moving image that is being recorded simultaneously to the RAM 103. The information related to the moving image that is being recorded simultaneously refers to information that uniquely specifies the moving image file generated in step S202 and information of the counter i. Storing the information of the counter i makes it possible to specify the positions of still image frames relative to moving image frames during reproduction.

In step S708, the control unit 101 writes a JPG file compressed in step S706 to the removable recording medium via the media drive 106. At this time, the shooting-time settings in the RAM 103 and the information related to the moving image, which was stored in step S707, are written to a header. In step S709, the control unit 101 turns ON a still image recording flag indicating that recording of the still image is in progress. The still image recording flag is stored in the RAM 103. On the other hand, in step S710, the control unit 101 turns OFF the still image recording flag indicating that recording of the still image is in progress.

Returning to the explanation of the processing for shooting the moving image, the control unit 101 determines whether the still image recording flag in the RAM 103 is ON in step S711. If it determines that the still image recording flag is ON, it proceeds to step S712. If it determines that the still image recording flag is OFF, it proceeds to step S713.

In step S712, the control unit 101 stores information related to the still image that is being recorded simultaneously to the RAM 103. The information related to the still image that is being recorded simultaneously refers to information that uniquely specifies the JPG file generated in step S708. For example, when the moving image frame to be processed in step S712 is the $i^{th}$ frame, the information refers to information of the JPG file corresponding to the $(i-1)^{th}$ frame. When i is 0, the corresponding JPG file has not been generated, and thus the information related to the still image that is being recorded simultaneously is not stored.

In step S713, the control unit 101 sequentially writes the shooting-time settings and the data generated in step S707 to the moving image file. It will be assumed that, when the information related to the still image that is being recorded simultaneously exists in the RAM 103, the information is appended to the shooting-time settings. Thereafter, in step S714, the control unit 101 discards the following items in the RAM 103: the image data, the corresponding shooting-time settings, the information related to the moving image that is being recorded simultaneously, and the information related to the still image that is being recorded simultaneously.

Thereafter, the control unit 101 executes the processes of steps S221 to S224 as in the first embodiment, then proceeds to step S701 if the next image data is to be read out, or otherwise ends the shooting and closes the moving image file.

Although the still image file is described as the JPG file in the present embodiment, the still image file may be stored in a BMP file format, a TIF file format, and the like that do not incur deterioration in image quality caused by compression, rather than as the JPG file, as long as the development processing has been applied to the image data. Furthermore, when generating a large number of individual JPG files complicates file management and the like, the still image file may be recorded in a MotionJPG format that places consecutive JPG images into a moving image file. In this case, it is sufficient to append audio information only during recording of the still image file.

As described above, in the present embodiment, still image frames are recorded as a still image file only in a period desired by the user. In this way, no matter when the best moment occurs during a period of recording of still images, still images can be obtained at an interval of 1/60 second, and the file size can be kept to the minimum as the still image file is generated only for a necessary period.

Furthermore, in generating a still image file and a moving image file in the present embodiment, information related to a moving image and a still image that are being recorded simultaneously is recorded. In this way, even if a period of recording of the still image file is shorter than a period of shooting of moving images, it is possible to specify the period in which the still image file was shot, and specify still image frames that correspond to individual moving image frames. Therefore, it is also possible to specify the period of recording of the still image file from the moving image file. Furthermore, when the user has decided on a desired frame from the moving image file, a corresponding high-quality still image frame can be obtained from the period of recording of the still image file. Conversely, it is also possible to specify a frame from the moving image file corresponding to the still image file; therefore, reproduction of moving images that were recorded simultaneously can be started with reference to a desired still image file.

Furthermore, in the present embodiment, moving image frames and still image frames are obtained alternately in a period in which the release button is pressed; at this time, a low shutter speed is set during shooting of moving images, and a high shutter speed is set during shooting still images. Therefore, similarly to the first embodiment, smooth moving images and still images without subject blur can be obtained simultaneously. At this time, as an exposure period for still image frames is shortened by setting the high shutter speed, the still image frames can be shot at a high ISO film speed. Therefore, development processing has the advantage of obtaining high-quality still images without significantly adjusting the luminance.

Furthermore, in the present embodiment, development processing suitable for still images is applied to a still image file. Therefore, high-quality still images can be obtained compared with a case of extracting and outputting moving image frames that have been recorded after undergoing development processing suitable for moving images.

Third Embodiment

A third embodiment will now be described. The foregoing second embodiment pertains to an example in which a JPG file shot as a still image is displayed when the previous frame button 607 or the next frame button 609 is operated (using information related to a still image corresponding to a moving image frame to be displayed, if such information exists). The third embodiment introduces processing that enables the user to select frames as representative images, and additionally stores the selected representative images to a moving image file. Processing for selecting frames as representative images is executed, for example, when the user selects favorite frames from moving images and when the user executes processing for deciding on representative thumbnails as moving image thumbnails.

Furthermore, in the present embodiment, when frames selected as representative images are included in a RAW moving image file, these still image frames can be additionally recorded to a moving image file. In this way, when the moving image file is transferred to another apparatus, for example, a mobile terminal, the mobile terminal that receives the moving image file can display the still image frames selected as the representative images without the trouble of transferring the RAW moving image file separately.

(User Interfaces for Deciding on Representative Image)

With reference to FIGS. 8A to 8C, the following describes processing for displaying frames during a frame selection operation according to the present embodiment, and user interfaces.

FIG. 8A shows timings for shooting moving image frames and still image frames. Frames that are shot in the exposure periods 300, 302, 304, and 306 illustrated in FIG. 3 are recorded as moving image frames A, C, E, and G, respectively, in a moving image file. On the other hand, frames that are shot in the exposure periods 301, 303, 305, and 307 are recorded as still image frames B, D, F, and H, respectively, in a RAW moving image file.

FIG. 8B shows the back surface of the digital camera 10, and operation members 600 to 607 and 609 are the same as in FIG. 6. In order to start frame selection processing for selecting a frame in operation, the user selects a menu via the setting button 605 and issues an instruction to start the frame selection processing. When the control unit 101 determines that the instruction to start the frame selection processing has been issued, it displays a moving image frame in operation on the display 601.

For example, when the user presses the next frame button 609 while the moving image frame A is displayed on the display 601, the control unit 101 subsequently displays the still image frame B. When the user subsequently presses the next frame button 609, the moving image frame C is displayed next. Thereafter, the still image frame D, the moving image frame E, the still image frame F, the moving image frame G, and the still image frame H are sequentially displayed in a similar manner.

On the other hand, when the previous frame button 607 is pressed while the still image frame H is displayed, the moving image frame G is subsequently displayed; thereafter, the still image frame F and the moving image frame E are each displayed in response to a single press of the same button. Reference sign 801 denotes a frame confirmation button. When the frame confirmation button is pressed during the frame selection processing, a frame that is currently displayed on the display 601 is set as a representative image. For example, when the frame confirmation button is pressed while the still image frame D is displayed on the display 601, the still image frame D is set as a representative image of the moving image file. As the still image frame D does not exist in the moving image file, the still image frame D is recorded and set as the representative image in the moving image file. Specific processing for setting a frame as a representative image will be described later with reference to a structure of the moving image file shown in FIG. 11.

(Sequence of Operations Related to Frame Selection Processing)

Figure 9A:
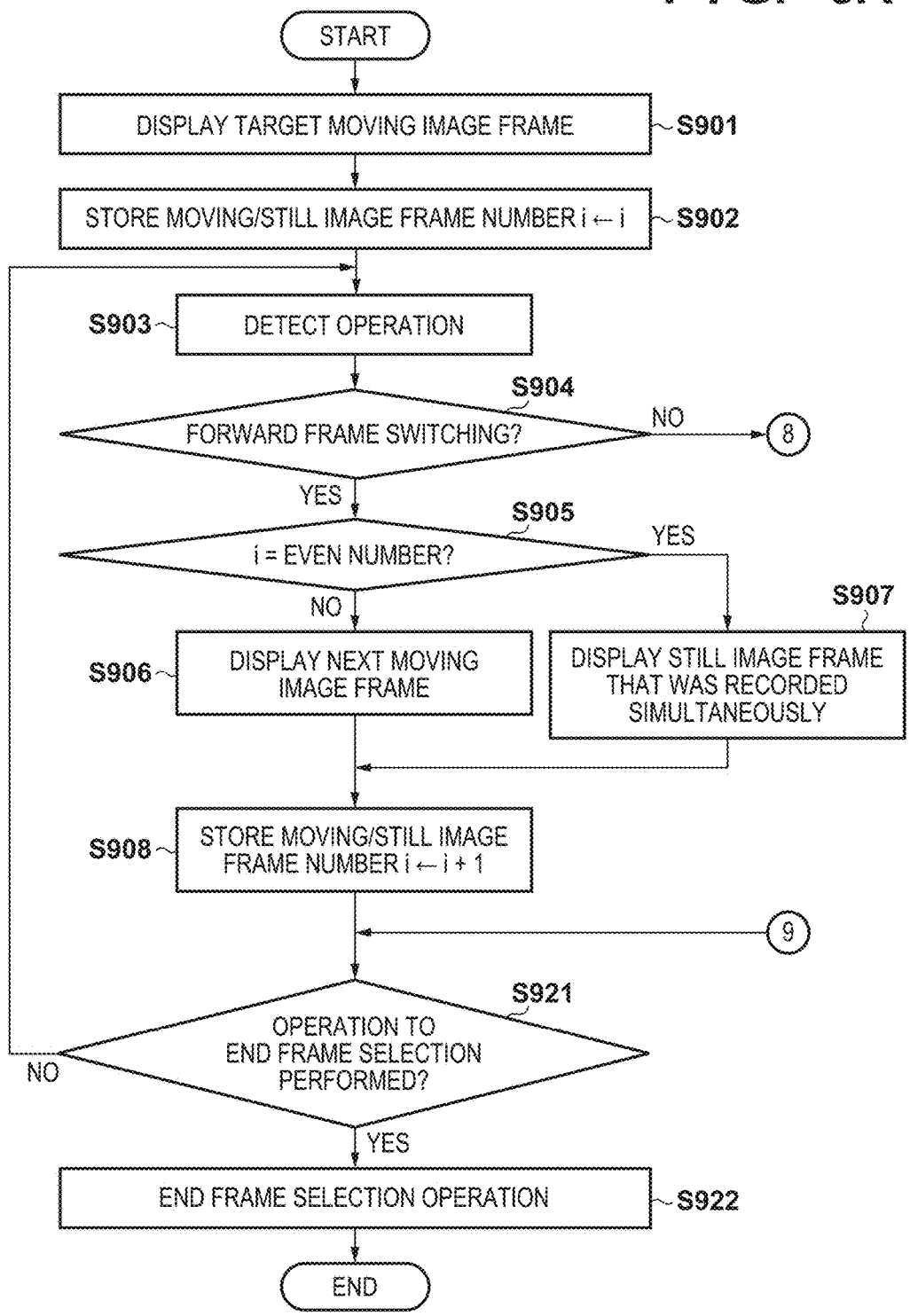
FIGS. 9A and 9B are flowcharts showing a sequence of operations for frame selection processing according to the third embodiment.
Figure 9B:
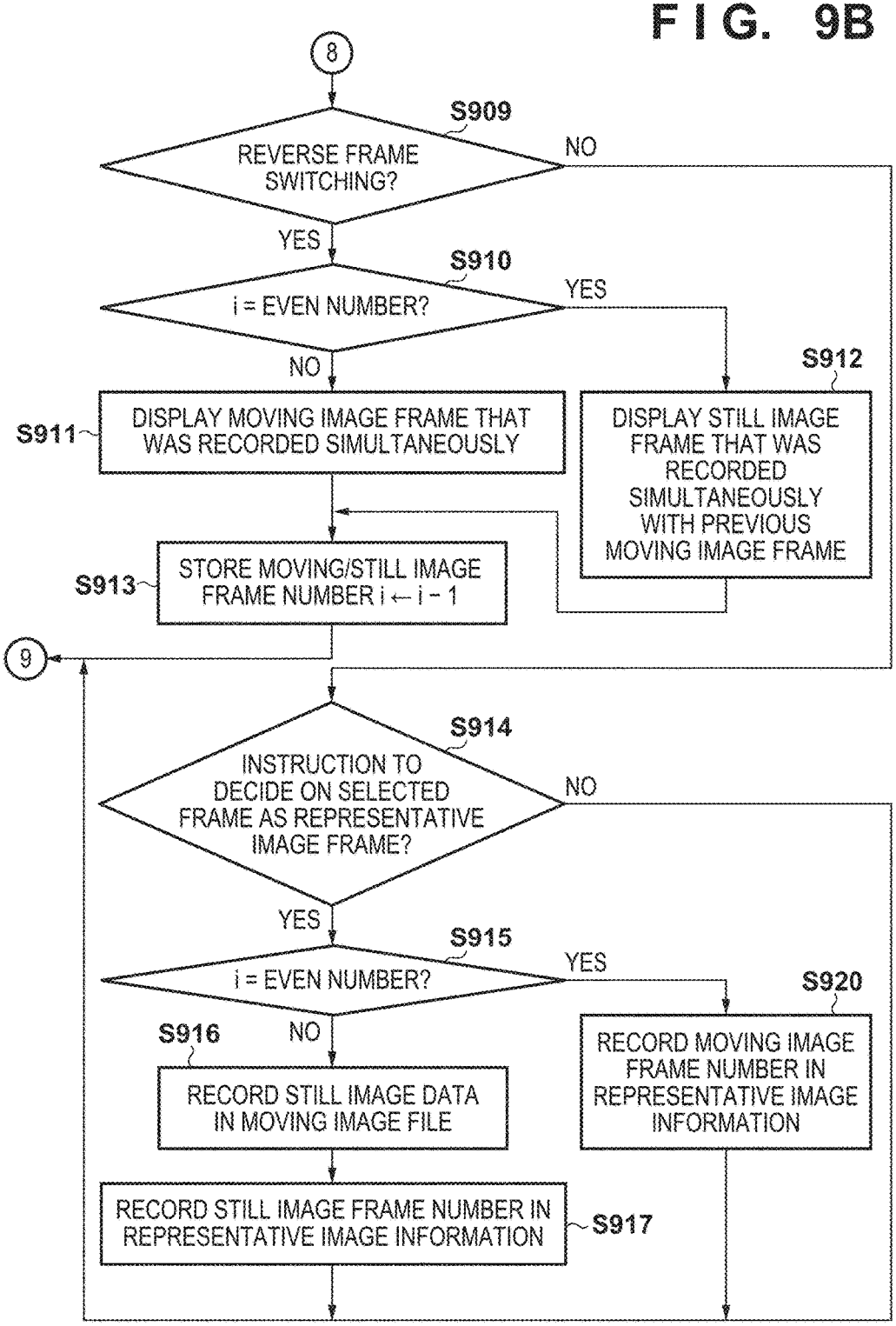

With reference to FIGS. 9A and 9B, the following describes a sequence of operations for the frame selection processing according to the present embodiment. This processing is executed by the control unit 101 executing a control program loaded to the RAM 103. When an instruction to start the frame selection processing has been issued by selecting a menu via the setting button 605 illustrated in FIG. 8B, it is determined that the user has performed an operation to start frame selection, and frame switching processing and the frame selection processing, which will be described below, are executed.

In step S901, the control unit 101 displays a moving image frame that was displayed when the frame selection operation was started. In step S902, a frame number i of the currently displayed frame (a moving/still image frame number) is assigned to the counter i. When a display operation has been suspended during display of moving images, the currently displayed frame is a moving image frame, and its frame number is an odd number (0, 2, 4, . . . ) as described earlier with reference to FIGS. 2A and 2B.

In step S903, the control unit 101 detects an operation during frame selection. In frame selection, one of the following operations is performed during frame-by-frame display: forward frame switching to switch from the currently displayed frame to an immediately succeeding frame; reverse frame switching to switch from the currently displayed frame to an immediately preceding frame; and deciding on the currently displayed frame as a representative image frame.

In step S904, the control unit 101 determines whether the operation during frame selection is the forward frame switching. It proceeds to step S905 if it determines that the operation is the forward frame switching, and proceeds to step S909 if it determines that the operation is not the forward frame switching. In step S905, the control unit 101 determines whether the moving/still image frame number of the currently displayed frame is an even number. If the moving/still image frame number of the currently displayed frame is not an even number, it means that the currently displayed frame has an odd frame number and is thus a still image frame, and accordingly the next moving image frame is displayed in step S906. On the other hand, if the moving/still image frame number of the currently displayed frame is an even number in step S905, the control unit 101 proceeds to step S907. In step S907, as the currently displayed frame has an even number and is thus a moving image frame, the control unit 101 displays a still image frame that was recorded simultaneously. In step S908, the control unit 101 increments the counter i to indicate that the frame number has advanced in the forward direction.

In step S909, as the operation during frame selection is not the forward frame switching, the control unit 101 determines whether the operation during frame selection is the reverse frame switching. It proceeds to step S910 if it determines that the operation is the reverse frame switching, and proceeds to step S914 if it determines that the operation is not the reverse frame switching. In step S910, the control unit 101 determines whether the moving/still image frame number of the currently displayed frame is an even number. If it is determined that the moving/still image frame number of the currently displayed frame is not an even number, it means that the currently displayed frame has an odd number and is thus a still image frame, and the control unit 101 accordingly displays a moving image frame that was recorded simultaneously with the still image (that was recorded immediately before the currently displayed still image in chronological order) in step S911. On the other hand, if the moving/still image frame number of the currently displayed frame is an even number in step S910, it means that the currently displayed frame is a moving image frame with an even number, and accordingly, a still image frame that was recorded simultaneously with a moving image frame that precedes the currently displayed moving image frame is displayed in step S912. Then, in step S913, the counter i is decremented (−1).

If the control unit 101 determines that the operation during frame selection is not the reverse frame switching in step S909, it determines whether the operation during frame selection is an instruction to decide a representative image frame in step S914. It proceeds to step S915 if the operation is the instruction to decide the representative image frame, and proceeds to step S921 if the operation is not the instruction to decide the representative image frame. In step S915, the control unit 101 determines whether the moving/still image frame number of the currently displayed frame is an even number. If the moving/still image frame number of the currently displayed frame is not an even number, it means that the currently displayed frame is a still image frame, and accordingly, data of the still image frame is additionally recorded in the moving image file in step S916. Then, in step S917, information of the added still image data is recorded in representative image information. The specifics of the representative image information will be described later with reference to FIG. 11.

If the control unit 101 determines that the moving/still image frame number of the currently displayed frame is an even number in step S915, it means that the currently displayed frame is a moving image frame, and accordingly, the moving image frame number is recorded in the representative image information in step S920. The specifics will be described later with reference to FIG. 11.

In step S921, the control unit 101 determines whether an operation to end the frame selection processing has been performed. If it determines that the operation to end the frame selection processing has not been performed, it returns to step S903 and repeats the processing. If it determines that the operation to end the frame selection processing has been performed, it executes processing for ending the frame selection operation in step S922. Specifically, it executes, for example, processing for displaying screens of normal moving images. The control unit 101 then ends the sequence of operations related to the present frame selection processing.

(Processing for Transferring Moving Images to Mobile Device)

The following describes processing for transferring recorded moving images including representative images to a mobile device.

When the moving image file and the RAW moving image file containing alternately shot frames according to the first embodiment are intended to be transferred to a mobile device, such as a smartphone and a tablet terminal, only the moving image file can be transferred in consideration of the transfer speed and the file size without transferring the RAW moving image file. As described above in connection to the frame selection processing, when still image frames have been selected as representative images, data of the still image frames is recorded in the moving image file. Therefore, simply transferring the moving image file to the mobile device enables the mobile device to display the still image frames in the moving image file that have been selected as the representative images.

Figure 10A:
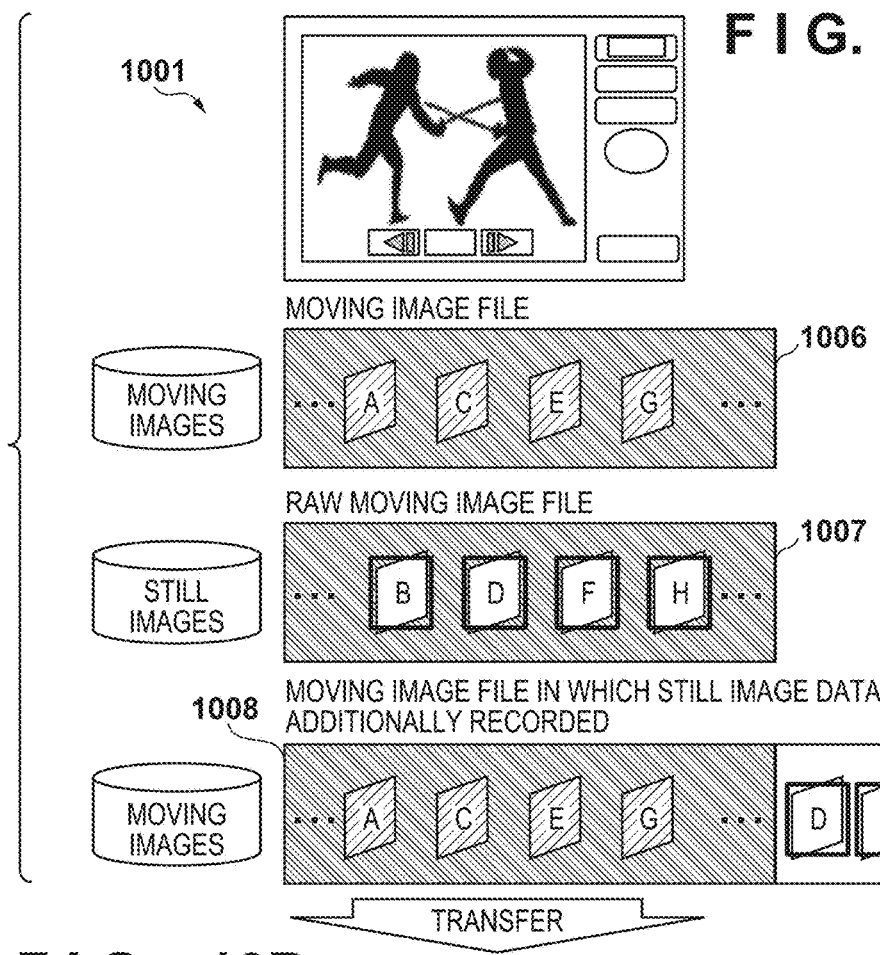
FIGS. 10A and 10B are diagrams for describing an example in which a moving image file is transferred to and displayed on a mobile device after the frame selection processing according to the third embodiment.
Figure 10B:
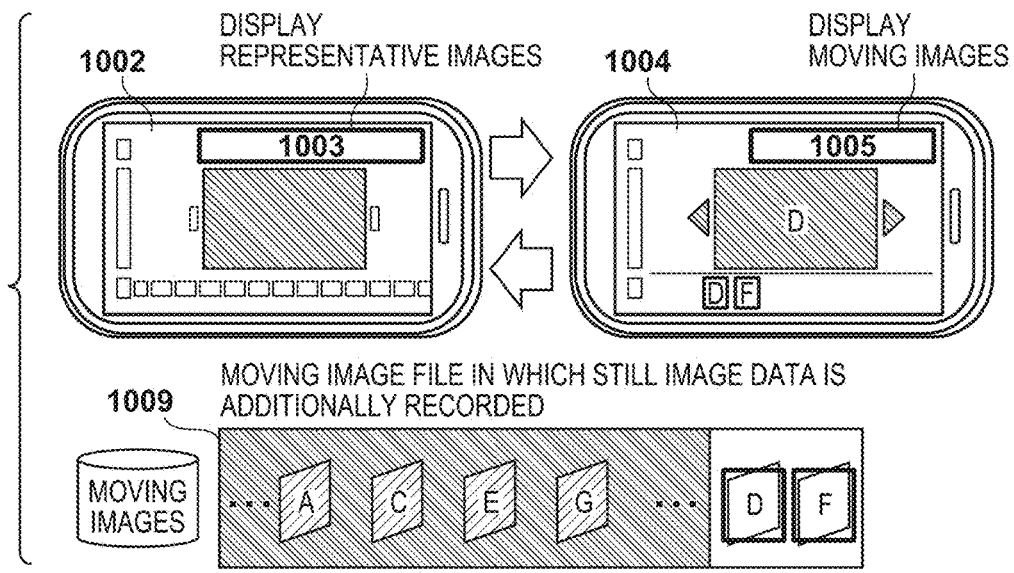

FIGS. 10A and 10B illustrate the concept of a moving image file to be transferred to a mobile device after the frame selection processing, and show examples of user interfaces on the image capturing apparatus and the mobile device.

FIG. 10A shows the structures of files in the digital camera. Reference sign 1001 denotes user interfaces that have been described with reference to FIG. 8B. Reference sign 1006 denotes a moving image file containing alternately shot frames as described in the first embodiment. Reference sign 1007 denotes a RAW moving image file containing alternately shot still image frames. Reference sign 1008 denotes a moving image file in which still image data of still image frames that have been selected as representative images are additionally recorded as described in the present embodiment. In the example shown, still image frames D and F are selected as representative images and recorded in the moving image file.

FIG. 10B shows interfaces and a file structure on the mobile device. Reference signs 1002 and 1004 denote exemplary user interfaces on the mobile device. Reference sign 1009 denotes the moving image file in which the still image data of the still image frames that have been selected as the representative images are additionally recorded, that is to say, the moving image file 1008 that has been transferred from the image capturing apparatus.

Reference sign 1002 denotes a user interface that displays moving images when this moving image file has been selected on the mobile device; as moving image data contains representative image data, a "move to representative images" menu 1003 is displayed thereon.

Reference sign 1004 denotes a user interface that displays representative image frames when the "move to representative images" menu has been pressed on the mobile device; only the frames that have been selected as the representative images are sequentially displayed thereon. Although the still image frames D and F are displayed in the example shown, moving image frames are additionally displayed when they have been selected as representative images.

Reference sign 1005 denotes a "display moving images" menu for switching from the user interface that displays the representative image frames to the user interface 1002 that displays the moving images.

(Structure of Moving Image File)

Figure 11:
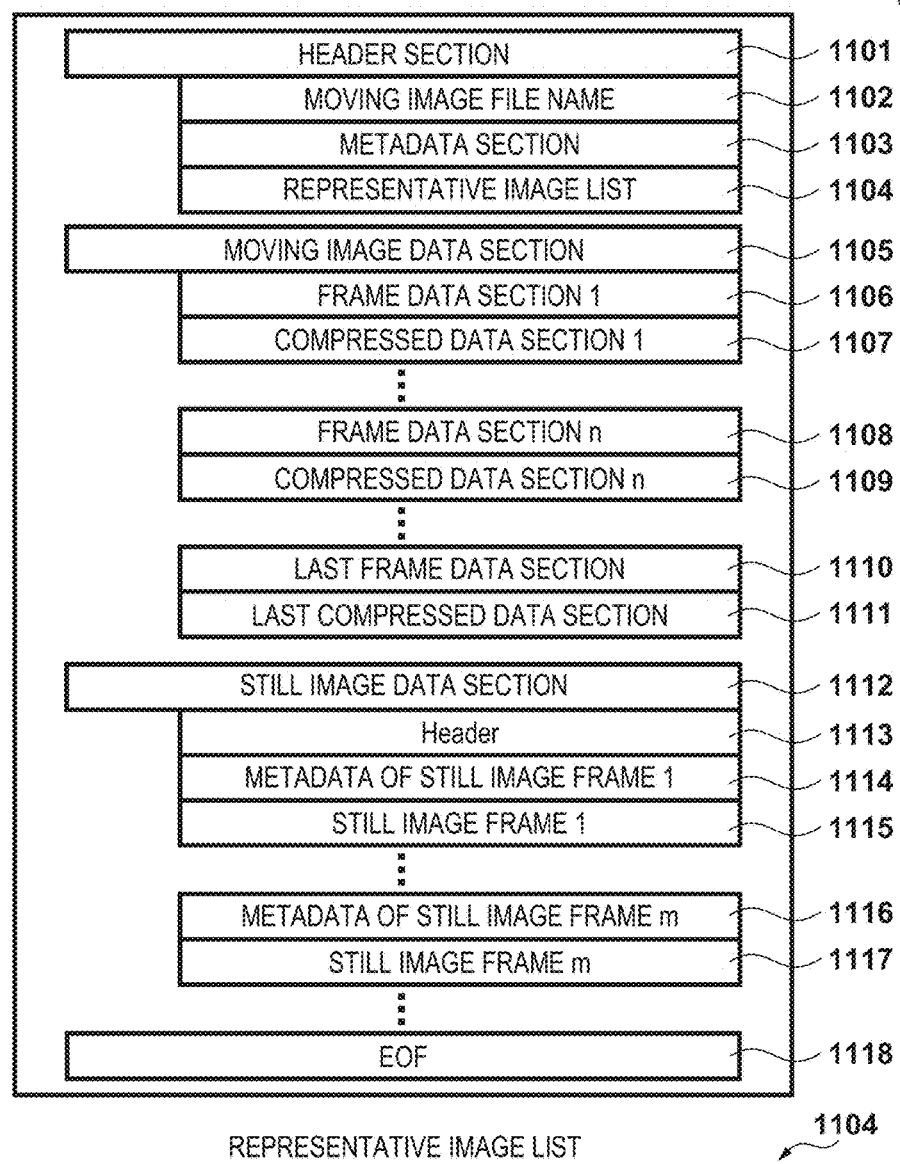
FIG. 11 schematically shows a structure of a moving image file according to the third embodiment.

With reference to FIG. 11, the following describes a structure of the moving image file according to the present embodiment. File information indicating a structure and the like is stored in a header section 1101. The header section 1101 contains a moving image file name 1102, a metadata section 1103 with shooting-time information and the like, and a representative image list 1104 which is information of the representative images.

Moving image data is recorded in a moving image data section 1105. In each of frame data sections 1106, 1108, and 1110, shooting-time information of a corresponding frame is stored in step S206. Because the brightness of and the distance to a subject vary each time shooting is performed, the shooting-time information of a corresponding moving image frame is recorded in each frame data section.

Pieces of moving image data 1107, 1109, and 1111 are obtained through shooting in step S206 and compressed in step S208. The moving image data 1107 corresponds to shooting that was performed based on the shooting-time information in 1106, and the moving image data 1109 corresponds to shooting that was performed based on the shooting-time information in 1108. Similarly, the moving image data 1111 of the last moving image frame corresponds to the shooting-time information in 1110. Ascending data numbers n correspond to frame numbers of moving image frames.

Still image data is recorded in a still image data section 1112, and this section is generated when still image data is additionally recorded in the moving image file upon deciding on the first still image frame as a representative image in step S916. Metadata sections 1114 and 1116 store shooting-time information of still image frames and information of moving images that were recorded simultaneously, such as moving image frame numbers. Frame data sections 1115 and 1117 for still images are identical to, for example, 402. Ascending numbers m in the still image data section correspond to still image data numbers. The metadata sections 1114 and 1116 and the frame data sections 1115 and 1117 for still images are generated and recorded so as to be equal in number to still image frames that have been decided on as representative images. Information 1118 is recorded as the information that indicates the footer of the file in step S224.

Lists 1121 to 1123 are provided as a more detailed breakdown of a structure of the representative image list 1104. In the example shown, data of the representative image list indicates that a moving image frame was selected and decided on as a representative image, and then two still image frames were selected and decided on as representative images. Representative image numbers 1121 are numbers of the representative images. Information 1122 indicates the type of each representative image, specifically, whether each representative image is a moving image frame or a still image frame. The positions of the representative images are indicated by 1123; in the case of the representative image 1, which is a moving image frame, its frame number in the moving image data section is recorded as its position. In the case of the representative images 2 and 3, which are still image frames, their data numbers in the still image data section are recorded as their positions.

As described above, in the present embodiment, desired frames can be recorded as representative images in a moving image file using the user interface that selects the frames as the representative images, and the moving image file having the representative images recorded therein can be transferred to a mobile terminal and the like. In this way, simply transferring nothing but the moving image file enables the mobile terminal to display moving images together with the frames that have been selected as the representative images.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-215563, filed Nov. 2, 2016, which is hereby incorporated by reference herein in its entirety.

What is claimed is:

1. An image capturing apparatus, comprising:
an image capturing unit configured to sequentially output one or more frames of image data of moving images and one or more frames of image data of still images as frames on a per-frame basis, each still image being shot between shootings of the moving images; and
a control unit configured to control the image capturing unit to shoot the still images at a first shutter speed and shoot the moving images at a second shutter speed, the first shutter speed being higher than the second shutter speed,
wherein the image capturing unit outputs the one of more frames of image data of the still images regularly to realize a predetermined ratio between the number of the frames of image data of the moving images and the number of the frames of image data of the still images.

2. The apparatus according to claim 1, wherein the control unit controls the image capturing unit to perform shooting with a substantial difference between the first shutter speed and the second shutter speed.

3. The apparatus according to claim 1, herein the control unit further controls the image capturing unit to perform shooting at an ISO film speed that brings brightness of the one of more frames of image data of the still images shot at the first shutter speed close to brightness of the one of more frames of image data of the moving images shot at the second shutter speed.

4. The apparatus according to claim 1, further comprising an image processing unit configured to apply first image processing to the one of more frames of image data of the moving images, and apply second image processing that is different from the first image processing to the one or more frames of image data of the still images.

5. The apparatus according to claim 1, further comprising:
a moving image file generation unit configured to generate a moving image file based on the one or more frames of image data of the moving images output from the image capturing unit, and
a still image file generation unit configured to generate a still image file based on the one or more frames of image data of the still images output from the image capturing unit.

6. The apparatus according to claim 5, wherein at least one of the moving image file and the still image file contains information that indicates a correspondence between a frame of image data of the still images and a frame of image data of the moving images that is adjacent to the frame of image data of the still images.

7. The apparatus according to claim 5, further comprising an instruction unit configured to issue an instruction to shoot image data of the still images,
wherein one or more frames of image data of the still images are recorded in the still image file while the instruction unit is issuing the instruction.

8. The apparatus according to claim 1, further comprising:
a moving image file generation unit configured to generate a moving image file based on the one or more frames of image data of the moving images output from the image capturing unit, and
a RAW generation unit configured to generate a RAW moving image file based on the one or more frames of image data of the still images output from the image capturing unit,
wherein the single RAW moving image file generated by the RAW generation unit contains a plurality of frames of image data of the still images output from the image capturing unit.

9. The apparatus according to claim 5, further comprising a display unit configured to display the one or more frames of image data of the still images and the one or more frames of image data of the moving images,
wherein the display unit displays the one or more frames of image data of the still images and the one or more frames of image data of the moving images in an order of output from the image capturing unit, or in a reverse order.

10. The apparatus according to claim 9, further comprising a selection unit configured to select one of the one or more frames of image data of the still images displayed on the display unit as one of representative images of the moving image file.

11. The apparatus according to claim 10, wherein the moving image file generation unit adds the representative image selected by the selection unit to the moving image file.

12. A control method of an image capturing apparatus comprising an image capturing unit configured to sequentially output one or more frames of image data of moving images and one or more frames of image data of still images as frames on a per-frame basis, each still image being shot between shootings of the moving images, the method comprising:
causing a control unit to control the image capturing unit to shoot the still images at a first shutter speed and shoot the moving images at a second shutter speed, the first shutter speed being higher than the second shutter speed,
wherein the image capturing unit outputs the one of more frames of image data of the still images regularly to realize a predetermined ratio between the number of the frames of image data of the moving images and the number of the frames of image data of the still images.

13. A non-transitory computer-readable storage medium storing a computer program, for causing a computer to function as an image processing apparatus comprising:
an image capturing unit configured to sequentially output one or more frames of image data of moving images and one or more frames of image data of still images as frames on a per-frame basis, each still image being shot between shootings of the moving images; and
a control unit configured to control the image capturing unit to shoot the still images at a first shutter speed and shoot the moving images at a second shutter speed, the first shutter speed being higher than the second shutter speed,
wherein the image capturing unit outputs the one of more frames of image data of the still images regularly to realize a predetermined ratio between the number of the frames of image data of the moving images and the number of the frames of image data of the still images.

* * * * *